(12) United States Patent
Shichiri et al.

(10) Patent No.: US 6,387,516 B2
(45) Date of Patent: *May 14, 2002

(54) INTERLAYER FOR LAMINATED GLASS AND LAMINATED GLASS

(75) Inventors: Tokushige Shichiri, Suita; Jiro Miyai; Akihiko Bando, both of Koka-gun; Kiyofumi Toyama, Takatsuki; Yoshio Aoshima, Kusatsu; Isei Sannomiya; Minoru Nakajima, both of Koka-gun, all of (JP)

(73) Assignee: Sekisui Chemical Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/269,412

(22) PCT Filed: Mar. 26, 1998

(86) PCT No.: PCT/JP98/01341

§ 371 Date: May 14, 1999

§ 102(e) Date: May 14, 1999

(87) PCT Pub. No.: WO99/03793

PCT Pub. Date: Jan. 28, 1999

(30) Foreign Application Priority Data

Jul. 17, 1997 (JP) ............................................. 9-192474
Aug. 7, 1997 (JP) ............................................. 9-213284
Aug. 20, 1997 (JP) ............................................. 9-223613
Sep. 11, 1997 (JP) ............................................. 9-247015
Sep. 18, 1997 (JP) ............................................. 9-253216
Jan. 6, 1998 (JP) ......................................... 10-000983
Feb. 3, 1998 (JP) ......................................... 10-022137

(51) Int. Cl.[7] ............................................. B32B 27/42
(52) U.S. Cl. ..................... 428/437; 428/332; 428/339; 428/426; 428/436

(58) Field of Search ................................. 428/426, 436, 428/437, 332, 339

(56) References Cited

U.S. PATENT DOCUMENTS 4,020,217 A * 4/1977 Karasudani et al. ......... 428/429
4,952,457 A * 8/1990 Cartier et al. ............ 428/425.6
5,340,654 A * 8/1994 Ueda et al. ................. 427/437

FOREIGN PATENT DOCUMENTS

BE 677788 9/1966
DE 19 26 958 2/1970
EP 0 373 139 A1 6/1990

OTHER PUBLICATIONS

Patent Abstracts of Japan, vol. 15, No. 115, Mar. 19, 1991 & JP 03 005772 A, Jan. 11, 1991.

* cited by examiner

*Primary Examiner*—Blaine Copenheaver
*Assistant Examiner*—Christopher Paulraj
(74) *Attorney, Agent, or Firm*—Connolly Bove Lodge & Hutz

(57) ABSTRACT

The present invention has it for its object to provide an interlayer film for laminated glass and a laminated glass which shows a much decreased extent of blushing of the peripheral region thereof even when placed in a high-humidity atmosphere, without compromise in those fundamental performance characteristics which are required of laminated glass, such as transparency, weather resistance, adhesion and penetration resistance. The present invention is related to an interlayer film for laminated glass comprising a plasticized poly(vinyl acetal) resin and having the haze after 24 hours of immersion is not more than 50% when said interlayer film with a thickness of 0.3 to 0.8 mm is immersed in water at 23° C.

24 Claims, No Drawings

INTERLAYER FOR LAMINATED GLASS AND LAMINATED GLASS

TECHNICAL FIELD

The present invention relates to an interlayer film for laminated glass and to a laminated glass in which said interlayer film for laminated glass is used.

BACKGROUND ART

Laminated glass comprising at least two glass sheets and a plasticized poly(vinyl butyral) interlayer film sandwiched therebetween has fundamental characteristics required of laminated glass. For example, it has good transparency, weather resistance, bond strength, and penetration resistance. It hardly allows its fragments to scatter. Thus, it has so far been widely used as the windshields of automobiles or buildings, for instance.

While laminated glass of this kind is excellent in fundamental characteristics such as mentioned above and in safety, it is poor in moisture resistance. Thus, when the above-mentioned laminated glass is used in a high humidity environment, a problem may arise; namely, the interlayer film in the peripheral region of the laminate may whiten, since the peripheral edges of laminated glass are in direct contact with the environmental air.

This phenomenon of blushing is associated with the additive used for adjusting the bond strength between the interlayer film and the glass, as mentioned below.

In order that the laminated glass will sufficiently discharge the functions mentioned above, it is necessary to adjust the bond strength between interlayer film and glass so that it may fall within an adequate range. Thus, if the bond strength between interlayer film and glass is too weak, glass fragments formed upon breakage due to an external shock may peel off from the interlayer film and scatter to increase the risk for injuring the human bodies and other objects. If, conversely, the bond strength between interlayer film and glass is excessively high, the glass and interlayer film tend to break simultaneously upon receiving a shock load whereupon glass fragments accompanying fragments of the interlayer film will scatter, thus increasing the risks for injuring the human bodies and other objects.

On the contrary, when the bond strength between interlayer film and glass is within an adequate range, breakage of glass occurs over a wide area and results in concurrent partial interfacial peeling of the interlayer film and glass from each other and elongation of the interlayer film, and these phenomena are effective in increasing the resistance against shock and penetration.

Thus, in order to insure that, taking a traffic accident involving an automobile as an example, the shock to the driver and/or passenger may be absorbed, the risk for their being hauled through the broken windshield may be prevented or, in the case of an accident related to a building, the penetration of flying objects against the window pane or scattering of broken glass fragments may be prevented, the bond strength between interlayer film and glass must be judiciously controlled within said suitable range.

In view of the foregoing, various bond strength control agents for the interlayer film have so far been investigated in order to adjust the bond strength between interlayer film and glass to a level within an adequate range.

Thus, for example, Japanese Kokoku Publication Sho-46-4270 proposes an interlayer film for laminated glass which comprises a poly(vinyl acetal) resin composition containing 0.2 to 0.8% by weight of water and a specific amount of a specific metal alkylcarboxylate as a bond strength control agent. The bond strength between the interlayer film and glass according to the above proposal is adjusted to an adequate range by varying the proportions of the metal alkylcarboxylate distributed in the superficial layer of the interlayer film and in the inside layer of the interlayer film or varying the water content of the interlayer film.

The metal alkylcarboxylate-containing interlayer film such as proposed in the above publication, however, is low in moisture resistance, and the laminated glass manufactured by using said interlayer film has a problem in that when allowed to stand in a high-humidity atmosphere, it tends to undergo severe blushing due to moisture absorption by the interlayer film as the metal alkylcarboxylate content increases since the interlayer film is in direct contact with air in the peripheral region of the laminated glass. The phenomenon of blushing of the interlayer film may be prevented by decreasing the amount of the metal alkylcarboxylate as far as possible or avoiding the use thereof but, in that case, there occurs a problem crucial for the laminated glass that the bond strength between interlayer film and glass exceeds the proper range and is ready to allow simultaneous breakage or penetration of the glass and interlayer film upon receiving to an external shock load or the like.

In Japanese Kokoku Publication Sho-44-32185, there is proposed an interlayer film for laminated glass which comprises a molded poly(vinyl acetal) resin having a water content of 0.1 to 0.8% and containing 0.01 to 3 parts by weight, per 100 parts by weight of the resin, of at least one organic acid selected from among monocarboxylic acids containing 6 to 22 carbon atoms, dicarboxylic acids containing 4 to 12 carbon atoms, aliphatic monoaminomonocarboxylic acids containing 2 to 6 carbon atoms, aliphatic monoaminodicarboxylic acids containing 4 or 5 carbon atoms, citric acid, and mixtures thereof.

However, this interlayer film has the drawback that the addition of such a carboxylic acid causes the bond strength to change with the lapse of time. Moreover, another problem may arise; the acid may adversely affect the heat resistance and weather resistance of the interlayer film.

Japanese Kokoku Publication Sho-48-5772 discloses a laminate glass comprising at least two glass sheets glued together by means of a plasticized poly(vinyl acetal) resin composition, said plasticized poly(vinyl acetal) resin composition contains the sodium metal salt of an aliphatic carboxylic acid containing 10 to 22 carbon atoms.

Furthermore, in Japanese Kokoku Publication Sho-53-18207, the use is proposed of an alkali metal or alkaline earth metal salt of a monocarboxylic or dicarboxylic acid as a bond strength control agent in the plasticized poly(vinyl acetal) resin interlayer film.

In either of the above two proposals, a metal salt of a carboxylic acid containing a relatively large number of carbon atoms is used as the bond strength control agent, since such salt is readily soluble in the plasticizer contained in the interlayer film.

However, when a metal salt of a carboxylic acid containing a large number of carbon atoms is used as the bond strength control agent, there occurs a problem that the bond strength between interlayer film and glass changes with the lapse of time. Thus, even when the bond strength is adequate initially, the bond strength will gradually decrease with the lapse of time and the glass will readily undergo peeling when it receives a shock. For preventing this decrease in bond strength, it is necessary to mature the interlayer film by storing the same in an atmosphere of 40 to 50° C. for 1 to 2 months, for instance. However, since the interlayer film has tackiness and a tendency toward self-adhesion, it is as a matter of fact difficult to store the interlayer film in such an atmosphere as mentioned above for a long period of time. Even if the maturing is performed, the decrease in bond strength with the lapse of time can be retarded but cannot be made nil, and the problem mentioned above still remains.

Japanese Kokai Publication Sho-60-210551 discloses a laminated glass comprising at least two glass sheets glued together by means of an interlayer film composed of a plasticized poly(vinyl acetal) resin containing, or carrying as adhered thereto, 0.02 to 0.40 part by weight of the potassium salt of a monocarboxylic acid containing 1 to 6 carbon atoms and 0.01 to 0.26 part by weight of a modified silicone oil per 100 parts by weight of said resin. Certain metal salts, however, may cause blushing of the laminated glass due to their coagulation in the form of particles within the interlayer film. Therefore, from the viewpoint of long-term prevention of blushing resulting from moisture absorption, said laminated glass cannot be said to be a perfect one.

In Japanese Kokoku Publication Hei-02-41547, there is proposed a poly(vinyl butyral) sheet in which an alkali or alkaline earth metal salt of formic acid is used as the bond strength control agent. Furthermore, in Japanese Kohyo Publication Hei-06-502594, an interlayer film containing potassium acetate added as a bond strength control agent is used in the examples of its specification.

In the three proposals mentioned above, a metal salt of a carboxylic acid containing a relatively small number of carbon atoms is used to overcome the problems mentioned above in relation to the use of a metal salt of a carboxylic acid containing a large number of carbon atoms.

When a metal salt of a carboxylic acid containing a small number of carbon atoms is used as the bond strength control agent, the problem of the decrease in bond strength between interlayer film and glass with lapse of time can indeed be solved but the moisture resistance of the interlayer film becomes insufficient and, as a result, another problem arises, namely the peripheral (edge) region of the laminated glass tends to undergo blushing due to absorption of moisture.

More specifically, the interlayer film is generally capable of absorbing moisture under ordinary atmospheric (humidity) conditions and, therefore, in using it in the manufacture of a laminated glass, it is common practice to submit the interlayer film to the lamination process after adjusting its water content to not more than about 0.5% by weight in an atmosphere of 25% RH, for instance. Since, however, the peripheral region of laminated glass are generally exposed, the interlayer film absorbs moisture in a high-humidity environment, whereby the water content increases to about 2 to 3% by weight. On that occasion, water gathers around minute crystals of said metal salt of a carboxylic acid containing a small number of carbon atoms, such as potassium acetate, magnesium acetate or potassium formate, as occurring in the interlayer film, to cause blushing. If the addition amount of the carboxylic acid containing a small number of carbon atoms or a salt thereof is decreased to prevent blushing, the bond strength between interlayer film and glass will deviate from the proper range, hence the shock absorbing potential, penetration resistance and other properties of the laminated glass will become insufficient.

In Japanese Kokai Publication Hei-05-186250, an attempt is made to improve the carboxylic acid salt-containing interlayer film in respect of blushing by using an interlayer film for laminated glass which is composed of a resin composition comprising a poly(vinyl acetal) resin, a plasticizer, an alkali or alkaline earth metal salt of a mono- or dicarboxylic acid containing not more than 12 carbon atoms and an organic acid.

Furthermore, in Japanese Kokai Publication Hei-07-41340, an interlayer film for laminated glass is proposed which is formed from a resin composition comprising a poly(vinyl acetal) resin, a plasticizer, a carboxylic acid metal salt and a straight-chain fatty acid.

The laminated glass including the interlayer film for laminated glasses according to the above proposals show reduced degrees of blushing in the peripheral region in moisture resistance testing but the extent of reduction in blushing is yet unsatisfactory. Moreover, if the content of the straight-chain fatty acid is increased for further reducing the degree of blushing, foaming and/or discoloration may possibly occur when the laminated glass is exposed to a relatively high temperature.

While the interlayer films proposed in the above-cited publications are results of attempts to solve the blushing problem by improving the bond strength control agent, those interlayer films which contain no bond strength control agent also whiten as a result of moisture absorption. Our recent research works have revealed that those impurities mentioned below in the resin are involved in the blushing phenomenon as one of the causes thereof.

The interlayer film for laminated glass of the present invention comprises a poly(vinyl acetal) resin as the main component thereof. The process for producing poly(vinyl acetal) resins comprises a step of neutralization. In this neutralization process, an aqueous solution of sodium hydroxide, sodium hydrogen carbonate or the like sodium salt is used. When the sodium salt is used in excess or when another sodium salt is formed as a result of neutralization, the sodium salt may remain in the product poly(vinyl acetal) resin. This residual sodium salt forms particles during polymerization and/or drying, and those particles promote the aggregation of water on the occasion of water absorption by the poly(vinyl acetal) resin, hence serve as a major cause of blushing of the product interlayer film for laminated glass due to moisture absorption. Furthermore, a sodium salt may remain even in poly(vinyl alcohol) in some instances, and this sodium salt may also serve as a cause of blushing of the interlayer film for laminated glass due to moisture absorption in certain instances.

In recent years, the trend toward the use of laminated glass as the automobile side glass screen or in buildings has been increasing and, in these applications, laminated glass is often used with the peripheral portions thereof being exposed. The need for preventing the blushing phenomenon is becoming more and more increased.

SUMMARY OF THE INVENTION

The present invention which solves the above problems has it for its object to provide an interlayer film for laminated glass and a laminated glass in which said interlayer film is used and which shows a much decreased extent of blushing of the peripheral region thereof even when placed in a high-humidity atmosphere, without compromise in those fundamental performance characteristics which are required of laminated glass, such as transparency, weather resistance, adhesion and penetration resistance.

The present invention consists in an interlayer film for laminated glass comprising a plasticized poly(vinyl acetal) resin and having the haze after 24 hours of immersion of not more than 50% when said interlayer film with a thickness of 0.3 to 0.8 mm is immersed in water at 23° C.

DETAILED DESCRIPTION OF THE INVENTION

In the following, the present invention is described in detail.

The interlayer film for laminated glass of the present invention is such that when said interlayer film with a thickness of 0.3 to 0.8 mm is immersed in water at 23° C., the haze value after 24 hours of immersion is not more than 50%.

The inventors of the present invention found that an interlayer film for laminated glass showing a haze of not more than 50% when said interlayer film with a thickness of 0.3 to 0.8 mm is immersed in water at 23° C. for 24 hours is excellent in moisture resistance, showing little blushing in the peripheral region of the laminated glass even when placed in a high-humidity atmosphere. Based on this finding, the present invention has been completed.

When the haze mentioned above exceeds 50%, the blushing under high-humidity conditions cannot be fully prevented and poor moisture resistance may result, hence the above range is critical. In the present specification, said haze means a value measured by using an integrating turbidimeter after 24 hours of immersion of a sample interlayer film with a thickness of 0.3 to 0.8 mm in water at 23° C.

The interlayer film for laminated glass of the present invention comprises a plasticized poly(vinyl acetal) resin film, and said plasticized poly(vinyl acetal) sheet contains a poly(vinyl acetal) resin as a main component.

Said poly(vinyl acetal) resin preferably has an average degree of acetalization of 40 to 75 mole percent. When said degree is less than 40 mole percent, the compatibility with the plasticizer will be low, making it difficult, in some instances, to incorporate the plasticizer in an amount necessary for securing penetration resistance. When said degree is over 75 mole percent, the resulting interlayer film for laminated glass will have a low mechanical strength and, in addition, a prolonged reaction time will be required for resin preparation, which is often undesirable from the process viewpoint. A more preferred range is 60 to 75 mole percent. When said degree is less than 60 mole percent, the hygroscopicity will be high and, therefore, blushing may readily occur in some instances. A still more preferred range is 64 to 71 mole percent.

In the above plasticized poly(vinyl acetal) resin, the vinyl acetate content is preferably not more than 30 mole percent. When it is over 30 mole percent, blocking will readily occur in the process of resin production, making the resin production difficult. It is preferred that said content be not more than 19 mole percent.

Said plasticized poly(vinyl acetal) resin comprises a vinyl acetal component, a vinyl alcohol component and a vinyl acetate component. These components can be quantitated according to JIS K 6728 "Methods of testing poly(vinyl butyral)" or by the nuclear magnetic resonance (NMR) method, for instance.

In cases where the poly(vinyl acetal) resin comprises other than a poly(vinyl butyral) resin, the vinyl alcohol component and vinyl acetate component are first quantitated. The amount of the remaining vinyl acetal component can then be calculated by subtracting the amounts of the above both components from 100.

The poly(vinyl acetal) resin mentioned above can be produced by per se known methods. Thus, for example, poly(vinyl alcohol) is dissolved in warm water and, while maintaining the resulting aqueous solution at a specific temperature, for example 0 to 95° C., preferably 10 to 20° C., a necessary acid catalyst and a necessary aldehyde are added, and the acetalization reaction is allowed to proceed with stirring. The reaction temperature is then raised to 70° C. for carrying the reaction to completion, followed by neutralization, washing with water and drying, to give a poly(vinyl acetal) resin powder.

The above poly(vinyl alcohol) to serve as the starting material preferably has an average degree of polymerization of 500 to 5,000, more preferably 1,000 to 2,500. When it is less than 500, the product laminated glass may have only a low penetration resistance. When it exceeds 5,000, resin film forming may become difficult and, in addition, the strength of the resin film may become excessively high.

It is preferred that the vinyl acetate component in the poly(vinyl acetal) resin obtained account for not more than 30 mole percent. Therefore, it is preferred that the degree of saponification of the above poly(vinyl alcohol) be not less than 70 mole percent. When said degree is less than 70 mole percent, the transparency and/or heat resistance of the resin may be low and the reactivity may also be low. More preferably, said degree is not less than 95 mole percent.

The average polymerization degree and saponification degree of the poly(vinyl alcohol) can be determined according to JIS K 6726 "Methods of testing poly(vinyl alcohol)", for instance.

The aldehyde mentioned above is preferably an aldehyde containing 3 to 10 carbon atoms. When the number of carbon atoms is less than 3, sufficient resin film moldability may not be obtained in some instances. When it exceeds 10, the reactivity for acetalization will be low and, in addition, resin blocking may readily occur and cause difficulties in resin synthesis.

The aldehyde mentioned above is not limited to any particular species but includes aliphatic, aromatic, alicyclic and other aldehydes, such as propionaldehyde, n-butyraldehyde, isobutyraldehyde, valeraldehyde, n-hexylaldehyde, 2-ethylbutyraldehyde, n-heptylaldehyde, n-octylaldehyde, n-nonylaldehyde, n-decylaldehyde, benzaldehyde and cinnamaldehyde. Preferred are aldehydes containing 4 to 8 carbon atoms, such as n-butyraldehyde, n-hexylaldehyde, 2-ethylbutyraldehyde and n-octylaldehyde. Among them, n-butyraldehyde, which contains 4 carbon atoms, is more preferred, since the use of the resulting poly(vinyl acetal) resin contributes to an increased bond strength of the resin film as well as excellent weather resistance and to easy production of the resin. The aldehydes may be used either singly or in a combination of two or more species.

In the interlayer film of the present invention, the particle diameter of a sodium salt therein is preferably not more than 10 $\mu$m, more preferably not more than 5 $\mu$m. The particle diameter of potassium salt in the interlayer film is preferably not more than 5 $\mu$m.

When the sodium salt has a particle diameter greater than 10 $\mu$m or the potassium salt has a particle diameter greater than 5 $\mu$m, the salt particles may promote water aggregation and become a primary cause of blushing of the obtained interlayer film due to moisture absorption.

The sodium salt or potassium salt particle diameter referred to above is the particle diameter in the interlayer film. While the particle diameters of the sodium salt and potassium salt in the poly(vinyl acetal) resin, which are the primary raw material, are decreased in the process of sheet forming in some instances, said particle diameters are retained in other instances. Therefore, it is preferred that the particle diameters of sodium salt and potassium salt in the poly(vinyl acetal) resin be also within the above-specified range.

The particle diameters of sodium salt and potassium salt in the interlayer film can be determined by secondary ion imaging using a time-of-flight secondary ion mass spectrometer (TOF-SIMS).

In the interlayer film of the present invention, the sodium concentration is preferably not more than 50 ppm, and the potassium concentration in the interlayer film is preferably not more than 100 ppm. More preferably, the sodium concentration should be not less than 0.5 ppm and not more than 15 ppm, and the potassium concentration should be not less than 0.5 ppm and not more than 100 ppm.

When the sodium content of the interlayer film is over 50 ppm and/or the potassium content is over 100 ppm, water molecules gather around the sodium element and potassium element and grow to macroscopic sizes, whereupon blushing may become prominent. To prepare an interlayer film having a sodium content of less than 0.5 ppm and a potassium content of less than 0.5 ppm is not preferred from practical points of view in some instances, since the step of washing for eliminating the remaining sodium element or potassium element coming from the resin preparation step must be excessively prolonged and/or the degree of purification of water and other raw materials must be raised, among other measures, hence much time and expenses are required.

The concentration of sodium and that of potassium in the interlayer film can be determined by elemental analysis using an ICP emission spectrometer. The elemental analysis by ICP emission spectrometry is a technique comprising heating and decomposing the sample with sulfuric acid and nitric acid, making the decomposition product to volume with ultrapure water and then performing assaying by the ICP-AES method.

The inclusion of said sodium and/or potassium results from the use, for example in the preparation of poly(vinyl acetal) resin, of a sodium or potassium element-containing neutralizing agent, such as sodium carbonate, sodium hydrogen carbonate, sodium acetate, sodium hydroxide, potassium carbonate, potassium hydrogen carbonate, potassium acetate or potassium hydroxide, for neutralization of the acid catalyst used for the reaction, such as sulfuric acid or hydrochloric acid.

The neutralization procedure in the above poly(vinyl acetal) resin production process is effective in preventing the acid catalyst such as hydrochloric acid (HCl), which is essential for the poly(vinyl acetal) resin formation reaction in the preceding step, from remaining in the resin and deteriorate the very resin.

Usable as said neutralizing agent are alkali metal salts and alkaline earth metal salts. Unlike alkali metals, alkaline earth metals, when remaining in the interlayer film in fairly large amounts, can prevent blushing under high-humidity conditions, hence are preferred.

As said alkaline earth metal salts, there may be mentioned, among others, magnesium salts such as magnesium hydrogencarbonate, magnesium hydroxide, basic magnesium carbonate, barium salts such as barium hydroxide, and calcium salts such as calcium hydroxide.

The inclusion of said sodium and/or potassium also results from the sodium or potassium salt of a carboxylic acid and octylic acid, etc., added as a bond strength control agent, which is remaining in the interlayer film, or from the sodium element or potassium element contained in water and other raw materials used, in particular in poly(vinyl alcohol), and remaining in the interlayer film.

The amount of such alkali metals contained in pure water can be reduced to 1 ppm or less through the use of deionized water, for instance. On the other hand, the alkali metal content of the poly(vinyl alcohol) comes from the sodium acetate formed in the course of saponification of poly(vinyl acetate) in the process for producing the raw material poly(vinyl alcohol), and it is generally 0.4 to 1.5% by weight.

Therefore, by using a poly(vinyl alcohol) material having a sodium acetate content of not more than 0.4% by weight, the sodium element in the resin, which is hardly removable by washing, can be reduced and, by intensified washing or like measures, the sodium element can be consistently reduced to 50 ppm or below.

In the above process for poly(vinyl acetal) resin production, it is also possible to reduce the alkali metal content by washing the poly(vinyl acetal) resin with water until a pH of 5 or above is attained, followed by drying at a temperature not higher than 60° C., without resort to the neutralization procedure mentioned above. By sufficient washing with water until a pH of 5 or above is attained, the content of the alkali metal, which is causative of blushing of the resulting resin film, can be reduced to a amount not over a required amount. Further, by drying at a relatively low temperature not higher than 60° C., the resin can be protected against deterioration due to the inclusion of alkali metal and the remaining acid catalyst and, at the same time, the drying equipment can be protected from being corroded by the acid. Although the drying procedure may be carried out by any ordinary method, the vacuum drying method, in particular, is efficient and superior.

In the above step of washing with water, washing is preferably carried out with water at a temperature of not lower than 40° C. Taking into consideration the fact that the resin in the slurry swells at 40° C. or above, the temperature of water to be used for washing is raised to 40° C. or above so that the efficiency of washing can be improved and resin deterioration due to the inclusion of alkali metal and/or acid catalyst residues can be prevented. By using washing water at 40° C. or above, preferably 40 to 60° C., in the step of washing, the resin in the slurry swells and the acid (HCl) and the neutralization product (alkali metal-containing product) contained in the resin can be readily washed away, whereby the washing efficiency can be improved. If the washing water temperature is below 40° C., the resin cannot swell to a satisfactory extent, hence the efficiency can hardly be improved. If the washing water temperature is higher than 60° C., the resin softens and resin particles stick together, forming blocks, hence the resin cannot have a stable particle size; in addition, any marked improvement in efficiency cannot be expected as compared with water at 60° C. and, thus, a waste of energy results.

An alternative method may also be mentioned for preventing the above-mentioned inclusion of sodium and potassium. This method comprises using, in synthesizing a poly(vinyl acetal) resin by reacting poly(vinyl alcohol) with an aldehyde in the presence of hydrochloric acid catalyst, an epoxide as both a reaction terminator and a hydrochloric acid eliminator and subjecting the resulting poly(vinyl acetal) resin to sheet formation.

Said epoxide includes, among others, 1,2-epoxides of the general formula (I):

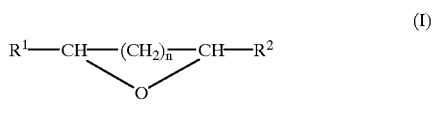
(I)

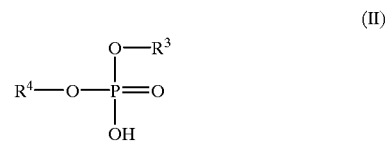
(II)

(wherein $R^1$ and $R^2$ each represents a hydrogen atom or an alkyl group and n represents an integer of 0 to 3), as well as 1,3-epoxides such as trimethylene oxide, tetrahydrofuran and tetrahydropyran, 1,4-epoxides, 1,5-epoxides and the like. These may be used singly or two or more of them may be used combinedly. Particularly preferred as the epoxide are ethylene oxide, propylene oxide and the like.

The above epoxide can be used in an effective amount sufficient to terminate the reaction and eliminate the hydrochloric acid.

As regards the mode of use of the above epoxide, the epoxide is used in lieu of the hydrochloric acid catalyst neutralizing agent to terminate the acetalization reaction and further to eliminate the hydrochloric acid, whereby the resin can be prevented from deterioration due to the inclusion of alkali metal and/or retention of acid catalyst.

In the present invention, it is preferred that a dispersant be incorporated in the interlayer film for laminated glass so that blushing under high-humidity conditions can be prevented more effectively.

As said dispersant, there may be mentioned compounds capable of forming complexes with sodium salts and potassium salts, organic acids compatible with the resin and plasticizer, and amines compatible with the resin and plasticizer.

Said compounds capable of forming complexes with sodium salts and potassium salts render the surroundings of metal salts such as sodium salts and potassium salts hydrophobic and thereby render it difficult for water to approach said surroundings, with the result that even upon moisture absorption by the poly(vinyl acetal) resin, the interlayer film for laminated glass as obtained can be prevented from undergoing blushing.

The above-mentioned compound capable of forming complexes with sodium salts and potassium salts includes but is not limited to ethylenediaminetetraacetic acid, salicylaldehyde, salicylic acid, salicylanilide, oxalic acid, 1,10-phenanthroline, acetylacetone, 8-hydroxyquinoline, dimethylglyoxime, 1,1-cyclohexanediacetic acid, salicylaldoxime and glycine. These may be used either singly or two or more of them may be used in combination.

The addition amount of the compound capable of forming complexes with sodium salts and potassium salts depends on the amount of the metal salt remaining in the poly(vinyl acetal) resin but is preferably within the range of 0.02 to 2 parts by weight per 100 parts by weight of the poly(vinyl acetal) resin. At an addition amount below 0.02 part by weight, the preventive effect on the blushing due to moisture absorption may be insufficient. At an addition amount exceeding 2 parts by weight, the compatibility with the poly(vinyl acetal) resin will be poor and a transparency problem may arise in some instances. A more preferred range is 0.05 to 1 part by weight.

Organic acids compatible with the resin and plasticizer and amines compatible with the resin and plasticizer can also be used as the dispersant mentioned above.

Among said organic acids compatible with the resin and plasticizer, at least one member selected from the group consisting of sulfonic acids containing 2 to 21 carbon atoms, carboxylic acids containing 2 to 20 carbon atoms, and phosphoric acids of the general formula (II) given below is used.

(In the above formula, $R^3$ represents an aliphatic hydrocarbon group containing 1 to 18 carbon atoms or an aromatic hydrocarbon group containing 1 to 18 carbon atoms, and $R^4$ represents a hydrogen atom, an aliphatic hydrocarbon group containing 1 to 18 carbon atoms, or an aromatic hydrocarbon group containing 1 to 18 carbon atoms.)

Referring to the sulfonic acids containing 2 to 21 carbon atoms, if the number of carbon atoms is less than 2, the hydrophilicity will be high, hence the compatibility with the poly(vinyl acetal) resin will be poor and insufficient dispersion will result. If the number of carbon atoms is over 21, the sulfonic acid will be hydrophobic, hence the compatibility with the poly(vinyl acetal) resin will be poor and phase separation may possibly occur. More preferred are those containing 7 to 18 carbon atoms.

The sulfonic acids containing 2 to 21 carbon atoms may be aliphatic or aromatic, for instance. The sulfonic acids containing 2 to 21 carbon atoms thus include, but are not limited to, benzenesulfonic acid, naphthalenesulfonic acid, alkylsulfonic acids with the alkyl moiety thereof containing 2 to 21 carbon atoms, alkylbenzenesulfonic acids with the alkyl moiety thereof containing 2 to 15 carbon atoms, and alkylnaphthalenesulfonic acids with the alkyl moiety thereof containing 2 to 11 carbon atoms, among others. More specifically, there may be mentioned p-toluenesulfonic acid, dodecylbenzenesulfonic acid, camphorsulfonic acid, hydroxypropanesulfonic acid, mesitylenesulfonic acid, and the like. These may be used singly or two or more of them may be used in combination.

The addition amount of the sulfonic acids containing 2 to 21 carbon atoms is preferably 0.01 to 2 parts by weight per 100 parts by weight of the poly(vinyl acetal) resin. At an addition amount less than 0.01 part by weight, the preventive effect on the blushing due to moisture absorption will be insufficient in some instances. At an addition amount exceeding 2 parts by weight, the resin deterioration may be promoted or the sulfonic acids themselves may cause the blushing. A more preferred addition amount is within the range of 0.03 to 1 part by weight.

Referring to the carboxylic acids containing 2 to 20 carbon atoms, if the number of carbon atoms is less than 2, the hydrophilicity will be high, hence the compatibility with the poly(vinyl acetal) resin will be poor and insufficient dispersion will result. If the number of carbon atoms is over 20, the carboxylic acid will be hydrophobic, hence the compatibility with the poly(vinyl acetal) resin will be poor and phase separation may possibly occur. More preferred are those containing 6 to 14 carbon atoms.

The carboxylic acids containing 2 to 20 carbon atoms may be aliphatic or aromatic, for instance. They may be dicarboxylic acids. Said carboxylic acids containing 2 to 20 carbons atoms thus include, but are not limited to, acetic acid, propionic acid, butyric acid, isobutyric acid, 2-ethylbutyric acid, octanoic acid, 2-ethylhexylic acid, lauric acid, myristic acid, stearic acid, oxalic acid, malonic acid, succinic acid, adipic acid, pimelic acid, sebacic acid, oleic acid, benzoic acid, toluic acid, naphthoic acid, 1,1-cyclohexanediacetic acid, salicylic acid and the like. These may be used singly or two or more of them may be used in combination.

The addition amount of the carboxylic acids containing 2 to 20 carbon atoms is preferably 0.01 to 3 parts by weight per 100 parts by weight of the poly(vinyl acetal) resin. At an addition amount less than 0.01 part by weight, the preventive effect on the blushing due to moisture absorption will be insufficient in some instances. At an amount exceeding 3 parts by weight, the compatibility with the resin will be poor and a transparency problem may arise or resin deterioration may be promoted. A more preferred range is 0.05 to 1 part by weight.

Referring to $R^3$ and $R^4$ in the phosphoric acids represented by the above general formula (II), if the number of carbon atoms in the aliphatic hydrocarbon group or aromatic hydrocarbon group exceeds 18, the phosphoric acid will be hydropholic, hence the compatibility with the poly(vinyl acetal) resin will be poor. A more preferred range of the number of carbon atoms is 6 to 12.

The phosphoric acids of general formula (II) include but are not limited to methylphosphoric acid, ethylphosphoric acid, propylphosphoric acid, isopropylphosphoric acid, butylphosphoric acid, laurylphosphoric acid, stearylphosphoric acid, 2-ethylhexylphosphoric acid, di(2-ethylhexyl) phosphoric acid, isodecylphosphoric acid, phenylphosphoric acid, dimethylphosphoric acid, diethylphosphoric acid, diisopropylphosphoric acid, dioctylphosphoric acid, diphenylphosphoric acid and dibenzylphosphoric acid. These may be used singly or two or more of them may be used in combination.

The addition amount of the phosphoric acid of general formula (II) is preferably 0.01 to 2 parts by weight per 100 parts by weight of the poly(vinyl acetal) resin. At an addition amount below 0.01 part by weight, the preventive effect on the blushing due to moisture absorption will be insufficient in some instances. At an amount exceeding 2 parts by weight, resin deterioration may be rather promoted or the phosphoric acid itself may cause the blushing. A more preferred range is 0.03 to 1 part by weight.

The organic acid compatible with the resin and plasticizer is used in combination with the amine compatible with the resin and plasticizer. Suited for use as the amine compatible with the resin and plasticizer are amines of the general formula (III):

(III)

(wherein $R^5$, $R^6$ and $R^7$ may be the same or different and each represents a hydrogen atom, an aliphatic hydrocarbon group containing 1 to 20 carbon atoms or an aromatic hydrocarbon group containing 1 to 20 carbon atoms).

When the number of carbon atoms in the aliphatic hydrocarbon group or aromatic hydrocarbon group mentioned above exceeds 20, the amine becomes hydrophobic, hence the compatibility with the poly(vinyl acetal) resin may be poor in some instances. It is preferred that one of $R^5$, $R^6$ and $R^7$ be a long-chain one. More preferably, $R^5$ and $R^6$ each independently is a hydrogen atom or a hydrocarbon group containing 1 or 2 carbon atoms, and $R^7$ is a hydrocarbon group containing 6 to 16 carbon atoms.

The amine of general formula (III) includes but is not limited to primary amines such as methylamine, ethylamine, propylamine, hexylamine, octylamine, decylamine, dodecylamine, tetradecylamine, aniline, toluidine, naphthylamine, etc.; secondary amines such as dimethylamine, diethylamine, dipropylamine, dihexylamine, dioctylamine, N-methylaniline, etc.; tertiary amines such as trimethylamine, triethylamine, N,N-dimethylhexylamine, N,N-dimethyloctylamine, N,N-dimethyldecylamine, N,N-dimethyldodecylamine, N,N-dimethylaniline, pyridine, etc., among others. These may be used singly or two or more of them may be used in combination.

When a sulfonic acid containing 2 to 21 carbon atoms is used as the organic acid compatible with the resin and plasticizer, the addition amount of the amine of general formula (III) is preferably 0.01 to 2 parts by weight per 100 parts by weight of the poly(vinyl acetal) resin. At an addition amount less than 0.01 part by weight, the preventive effect on the blushing due to moisture absorption may be insufficient. At an addition amount exceeding 2 parts by weight, the compatibility with the resin will be poor, and a transparency problem may arise or the interlayer film may be discolored. A more preferred range is 0.02 to 1 part by weight.

When a carboxylic acid containing 2 to 20 carbon atoms is used as the organic acid compatible with the resin and plasticizer, the addition amount of the amine of general formula (III) is preferably 0.01 to 3 parts by weight per 100 parts by weight of the poly(vinyl acetal) resin. At an addition amount below 0.01 part by weight, the preventive effect on the blushing due to moisture absorption may be insufficient. At an addition amount exceeding 3 parts by weight, the compatibility with the resin will be poor, and a transparency problem may arise or the interlayer film may be discolored. A more preferred range is 0.05 to 1 part by weight.

When a phosphoric acid of the above general formula (II) is used as the organic acid compatible with the resin and plasticizer, the addition amount of the amine of general formula (III) is preferably 0.01 to 2 parts by weight per 100 parts by weight of the poly(vinyl acetal) resin. At an addition amount below 0.01 part by weight, the preventive effect on the blushing due to moisture absorption may be insufficient. At an addition amount exceeding 2 parts by weight, the compatibility with the resin will be poor, and a transparency problem may arise or the interlayer film may be discolored. A more preferred range is 0.05 to 1 part by weight.

The organic acid compatible with the resin and plasticizer and the amine compatible with the resin and plasticizer used as a dispersant as mentioned above respectively take the form of ions, for example sulfonyl ion, carboxyl ion, phosphoryl ion, and ammonium ion. These ions act on the surface of the particulate metal salt in the poly(vinyl acetal) resin and bind the metal ion and counter ion constituting said metal salt. When the resin is kneaded prior to sheet formation, the metal salt carrying these ions are dispersed in the resin and, as a result, the metal salt in particulate form becomes smaller or disappear. Therefore, local aggregation of water molecules is prevented and, even when the poly (vinyl acetal) resin absorbs moisture, the interlayer film of the laminated glass can be prevented from blushing.

In the present invention, it is preferred that the interlayer film for laminated glass contain at least one salt selected from the group consisting of alkali metal salts and alkaline earth metal salts as a bond strength control agent.

Said alkali metal salts and alkaline earth metal salts include but are not limited to potassium salts, sodium salts, magnesium salts and so forth. As the salt-forming acid, there may be mentioned organic acids, for example carboxylic acids such as octylic acid, hexylic acid, butyric acid, acetic acid and formic acid; and inorganic acids such as hydrochloric acid and nitric acid.

Among the alkali metal salts and alkaline earth metal salts mentioned above, alkali metal salts of organic acids containing 5 to 16 carbon atoms and alkaline earth metal salts of organic acids containing 5 to 16 carbon atoms are preferred. More preferred are the magnesium salts of carboxylic acids or dicarboxylic acids containing 6 to 10 carbon atoms.

Said magnesium salts of carboxylic acids or dicarboxylic acids include but are not limited to magnesium 2-ethylbutyrate, magnesium valerate, magnesium hexanoate, magnesium heptanoate, magnesium octanoate, magnesium nonanoate, magnesium decanoate, magnesium glutarate and magnesium adipate, among others.

It is supposed that the magnesium salts of carboxylic acids or dicarboxylic acids containing 6 to 10 carbon atoms occur in the form of salts in the sheet without electrolytic dissociation, and attract water molecules, making it possible to suppress the bond strength between the interlayer film and glass, with the result that the penetration resistance of the product laminated glass can be improved. Furthermore, since they are distributed in high concentrations on the sheet surface without aggregation in the sheet, they show a bond strength modifying effect even in small amounts, without causing excessive blushing upon moisture absorption, therefore they are preferable.

Said alkali metal salts and alkaline earth metal salts preferably have a particle diameter of not more than 3 µm, more preferably not more than 1 µm. When said diameter exceeds 3 µm, water molecules around the alkali metal salt and/or alkaline earth metal salt particles grow to a macroscopic size, with the result that the blushing becomes unfavorably remarkable in some instances.

The means for reducing the particle size of 3 µm or less is not limited to any particular method. Thus, for example, there may be mentioned the method comprising using a compound readily soluble in the poly(vinyl acetal) resin and plasticizer as a bond strength control agent, the method comprising using a compound which is hardly soluble in the poly(vinyl acetal) resin and plasticizer but hardly aggregate in the poly(vinyl acetal) resin and plasticizer, and the method comprising combinedly using a dispersant or compatibilizing agent capable of dispersing said compounds.

When a poly(vinyl butyral) resin is used as the poly(vinyl acetal) resin and triethylene glycol 2-ethylbutyrate is used as the plasticizer, the compound readily soluble in the above formulation is, for example, an organic acid salt, such as magnesium octanoate, magnesium neodecanoate and magnesium adipate. These are suitably used either singly or in a combination of two or more species.

As the compound hardly soluble in the above formulation but hardly aggregating in the formulation, there may be mentioned inorganic acid magnesium salts such as magnesium chloride and magnesium nitrate. These are suitably used either singly or in a combination of two or more species.

The dispersant or compatibilizing agent capable of dispersing the compound hardly soluble in the formulation is not limited to any particular species but includes alcohols such as ethanol and octyl alcohol, and long-chain organic acids such as octanoic acid and nonanoic acid, among others. These are suitably used either singly or in a combination of two or more species.

Among the various methods mentioned above, the method comprising using a compound which is by itself readily soluble in the poly(vinyl acetal) resin and plasticizer is most preferred. The method comprising using a compound hardly aggregating in the poly(vinyl acetal) resin and plasticizer is next preferred.

When a diester compound is used as the plasticizer, it is preferred that the alkali metal salt and alkaline earth metal salt mentioned above have the same acid component structure as that of the diester compound. Owing to their having an acid component structure identical or similar to that of the diester compound used as the plasticizer, they can be present stably and uniformly dispersed in the sheet, hence will not undergo changes with the lapse of time.

When triethylene glycol di-2-ethylbutyrate (hereinafter referred to sometimes as "3GH") or dihexyl adipate (hereinafter referred to sometimes as "DHA") is used as the plasticizer, a metal salt of a carboxylic acid containing 5 or 6 carbon atoms is preferably used as a bond strength control agent, since, in that case, the decrease in the bond strength with the lapse of time between the interlayer film and glass can be prevented and the prevention of blushing and prevention of the decrease in the bond strength with the lapse of time can be simultaneously accomplished. When triethylene glycol di-2-ethylhexanoate (hereinafter referred to sometimes as "3GO") is used as the plasticizer, it is preferred, for the same reasons, that a metal salt of a carboxylic acid containing 6 to 8 carbon atoms be contained in the formulation. When tetraethylene glycol di-2-ethylhexanoate (hereinafter referred to sometimes as "4GO") is used as the plasticizer, it is preferred that a metal salt of a carboxylic acid containing 6 or 7 carbon atoms be contained in the formulation.

For preventing the above plasticized poly(vinyl acetal) resin as far as possible from undergoing heat-induced hydrolysis in the sheet forming step, the use of plasticizers less susceptible to hydrolysis such as plasticizers of the side chain type, such as 3GH, 3GO and 4GO, or of the adipate type, such as DHA, is preferred to the use of such plasticizers as triethylene glycol diheptanoate (3G7) and tetraethylene glycol diheptanoate (4G7).

Said 3GH has long been in use as a plasticizer in interlayer films with practically acceptable results and the organic acid constituent thereof is of the side chain type. Therefore, 3GH is more advantageous than 3G7, 4G7 and the like, which are of the straight chain type, in that it is less hydrolyzable. The above-mentioned 3GO and 4GO are advantageous in that they are higher in boiling point than 3GH, for instance, and therefore are less volatile in the sheet forming step or in the lamination step.

Said 3GH, 3GO, 4GO and DHA may be used singly or in combination with another plasticizer such as mentioned hereinafter. The mixing ratio of said 3GH, 3GO, 4GO and/or DHA to said other plasticizer is preferred that the amount of said other plasticizer be less than 50% by weight of the amount of said plasticizer(s) 3GH, 3GO, 4GO and DHA. When this ratio is over 50% by weight, the characteristic features of 3GH, 3GO, 4GO and DHA are sacrificed by said other plasticizer and, therefore, the effect of the bond strength control agent used in combination with them may not be expressed to a satisfactory extent.

The carboxylic acid metal salt to be used as the bond strength control agent, when the plasticizer in the interlayer film is specified as mentioned above, includes but is not limited to pentanoic acid (of 5 carbon atoms) metal salts, hexanoic acid (2-ethylbutanoic acid) (of 6 carbon atoms) metal salts, heptanoic acid (of 7 carbon atoms) metal salts, octanoic acid (of 8 carbon atoms) metal salts, and so forth. According to the plasticizer mentioned above, one, two or more of these are suitably used. The carboxylic acid may be of the straight chain type or of the side chain type.

When a metal salt of a carboxylic acid containing too small a number of carbon atoms is used, the interlayer film obtained will have an insufficient moisture resistance, which may allow the blushing phenomenon to occur widely. Conversely, if a metal salt of a carboxylic acid containing an excessively large number of carbon atoms is used, the decrease in the bond strength with the lapse of time between the interlayer film and glass may be insufficient.

The above-mentioned carboxylic acid metal salt as the bond strength control agent may be used independently or in combination with another bond strength control agent, for example a bond strength control agent of metal salt of carboxylic acid containing 1 to 4 carbon atoms type such as magnesium formate, magnesium acetate, magnesium propanoate or magnesium butanoate, or a modified silicone oil bond strength control agent such as mentioned later herein.

When said alkali metal salt and/or alkaline earth metal salt is added as a bond strength control agent, the addition amount thereof is preferably 0.01 to 0.2 part by weight per 100 parts by weight of the poly(vinyl acetal) resin. At an addition amount lower than 0.01 part by weight, the bond strength modifying effect will be nil, hence the penetration resistance of the product laminated glass may be low. At an amount exceeding 0.2 part by weight, the control agent may bleed out, impairing the transparency of the product laminated glass and at the same time leading to an excessively decreased bond strength between interlayer film and glass. A more preferred range is 0.03 to 0.08 part by weight.

When the alkali metal salt is a sodium salt, blushing tends to occur very readily, so that the sodium concentration should preferably be not more than 50 ppm. When the alkali metal salt is a potassium salt, too, blushing may occur readily, hence the potassium concentration should preferably be not more than 100 ppm.

In addition to the cases where said alkali metal salt and/or alkaline earth metal salt is added as the bond strength control agent, as mentioned above, there are cases where said salts come from the alkali metal salt or alkaline earth metal salt used as a neutralizing agent for the acid catalyst such as sulfuric acid or hydrochloric acid, used in the reaction for producing poly(vinyl acetal) resin, or cases in which said salt comes from one or more of various raw materials and water used in the reaction for producing poly(vinyl acetal) resin which contains said salt. The alkali metal salt and alkaline earth metal salt as said neutralizing agent may be used also as the bond strength control agent.

The interlayer film for laminated glass of the present invention comprises a plastic resin film composed of the above-mentioned poly(vinyl acetal) resin, a plasticizer and, where necessary, an additive such as the above-mentioned dispersant and/or bond strength control agent.

The plasticizer to be used in the present invention includes those known plasticizers for use in interlayer films of this kind, for example organic ester type plasticizers such as monobasic acid esters and polybasic acid esters, and phosphorus type plasticizers such as organic phosphate and organic phosphite plasticizers.

Preferred among said monobasic acid esters are those glycol esters which can be obtained by the reaction of triethylene glycol with an organic acid such as butyric acid, isobutyric acid, caproic acid, 2-ethylbutyric acid, heptanoic acid, n-octylic acid, 2-ethylhexylic acid, pelargonic acid (n-nonylic acid) or decylic acid. In addition, esters of tetraethylene glycol or tripropylene glycol with the organic acids mentioned above may also be used.

Preferred as said polybasic acid esters are, for example, esters of an organic acid such as adipic acid, sebacic acid or azelaic acid with a straight-chain or branched alcohol containing 4 to 8 carbon atoms.

As typical examples of said organic ester plasticizers which can be suitably used, there may be mentioned triethylene glycol di-2-ethylbutyrate, triethylene glycol di-2-ethylhexoate, triethylene glycol dicaprylate, triethylene glycol di-n-octoate, triethylene glycol di-n-heptoate, tetraethylene glycol di-n-heptoate and, further, dibutyl sebacate, dioctyl azelate and dibutylcarbitol adipate.

In addition, ethylene glycol di-2-ethylbutyrate, 1,3-propylene glycol di-2-ethylbutyrate, 1,4-propylene glycol di-2-ethylbutyrate, 1,4-butylene glycol di-2-ethylbutyrate, 1,2-butylene glycol di-2-ethylenebutyrate, diethylene glycol di-2-ethylbutyrate, diethylene glycol di-2-ethylhexoate, dipropylene glycol di-2-ethylbutyrate, triethylene glycol di-2-ethylpentoate, tetraethylene glycol di-2-ethylbutyrate, diethylene glycol dicaprylate and the like may also be used as the plasticizer.

Among the phosphate plasticizers, tributoxyethyl phosphate, isodecylphenyl phosphate, trisopropyl phosphite and the like are preferred.

Among the plasticizers mentioned above, diester compounds derived from a dicarboxylic acid and a monohydric alcohol or from a monocarboxylic acid and a dihydric alcohol are preferably incorporated in the resin composition.

The addition amount of said plasticizer is preferably 20 to 70 parts by weight, more preferably 40 to 60 parts by weight, per 100 parts by weight of the poly(vinyl acetal) resin. At an addition amount below 20 parts by weight, the penetration resistance of the product laminated glass may be low. At an addition amount exceeding 70 parts by weight, the plasticizer may bleed out, increasing the optical strain or decreasing the transparency and/or tackiness of the resin film.

In the present invention, known additives for use in interlayer films for laminated glass, for example modified silicone oils for controlling penetration resistance, ultraviolet absorbers, light stabilizers, antioxidants, surfactants and coloring agent, may also be incorporated as additives in addition to said dispersant and bond strength control agent.

The modified silicone oils mentioned above include but are not limited to epoxy-modified silicone oils, ether-modified silicone oils, ester-modified silicone oils, amine-modified silicone oils and carboxyl-modified silicone oils, such as disclosed in Japanese Kokoku Publication Sho-55-29950. Generally, these modified silicone oils are liquids obtained by reacting a compound to be modified to polysiloxane.

In the present invention, epoxy-modified silicone oils of the general formula (IV)

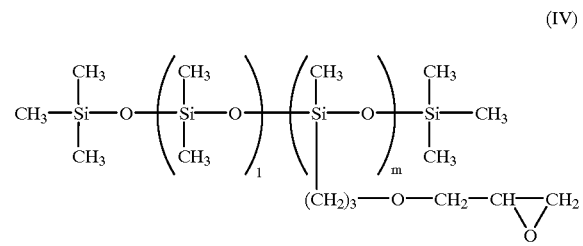

(wherein l and m each independently represents a positive integer not more than 30), ether-modified silicone oils of the general formula (V)

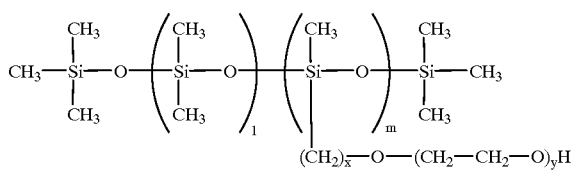

(V)

(wherein l and m each independently represents a positive integer not more than 30 and x and y each independently represents a positive integer not more than 20), and ester-modified silicone oils of the general formula (VI)

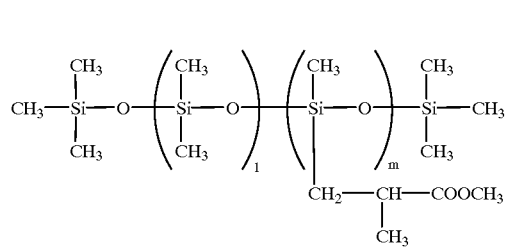

(VI)

(wherein l and m each independently represents a positive integer not more than 30) are particularly preferred. While the respective modified silicone oils are represented by the general formulas (IV), (V) and (VI) in terms of structural formulas for block copolymers, those represented by the structural formulas of random copolymers may also be used in the present invention.

The above modified silicone oils may be used singly or two or more of them may be used combinedly.

Said modified silicone oils preferably have a molecular weight of 800 to 5,000. When the molecular weight is less than 800, the extent of localization on the surface will be low. When it exceeds 5,000, the compatibility with the resin will become poor, so that the bleeding out will occur onto the film surface, causing the bond strength between sheet and glass to decrease. A more preferred range is 1,500 to 4,000.

The addition amount of said modified silicone oils is preferably 0.01 to 0.2 part by weight per 100 parts by weight of the poly(vinyl acetal) resin. At an addition amount below 0.01 part by weight, the preventive effect on the blushing due to moisture absorption will be insufficient. At an addition amount exceeding 0.2 part by weight, the compatibility with the resin will be poor, hence bleeding will occur onto the film surface, with the result that the bond strength to glass will decrease. A more preferred amount is 0.03 to 0.1 part by weight.

The above-mentioned antioxidant includes but is not limited to such phenolic compounds as t-butylhydroxytoluene (BHT) (Sumilizer BHT (trademark), product of Sumitomo Chemical), and tetrakis[methylene-3-(3',5'-di-t-butyl-4'-hydroxyphenyl)propionato]methane (Irganox 1010, product of Ciba-Geigy), among others.

Said ultraviolet absorbers include but are not limited to benzotriazole type such as 2-(2'-hydroxy-5'-methylphenyl) benzotriazole (Tinuvin P, product of Ciba-Geigy), 2-(2'-hydroxy-3'-5'-di-t-butylphenyl)benzotriazole (Tinuvin 320, product of Ciba-Geigy), 2-(2'-hydroxy-3'-t-butyl-5'-methylphenyl)-5-chlorobenzotriazole (Tinuvin 326, product of Ciba-Geigy) and 2-(2'-hydroxy-3',5'-di-t-amyl-phenyl) benzotriazole (Tinuvin 328, product of Ciba-Geigy), hindered amines such as LA-57 (product of Adeka-Argus), etc.

As said light stabilizers, there may be mentioned hindered amines, for example Asahi Denka Kogyo's Adekastab LA-57 (trademark).

As said surfactants, there may be mentioned, for example, sodium lauryl sulfate, alkylbenzenesulfonates, and the like.

The method of producing the interlayer film for laminated glass of the present invention is particular restricted, but for example, a required amount of the plasticizer, together with other additives as necessary, is incorporated into each of the resins mentioned above, the mixture is kneaded uniformly and then formed into sheets by means of the extrusion, calendering, pressing, casting, inflation or other methods and the resulting sheets are used as interlayer films.

In view of the minimum penetration resistance and weather resistance required of laminated glass and from the practical viewpoint, it is generally preferred that the total thickness of the interlayer film for laminated glass of the present invention be within the range of 0.3 to 1.6 mm, which is the thickness range of ordinary interlayer film for laminated glasses.

As the glass sheets to be used in the laminated glass, there may be mentioned not only transparent inorganic glass sheets but also transparent organic glass sheets, such as polycarbonate sheets and poly(methyl methacrylate) sheets.

The transparent inorganic glass sheets are not limited to any particular species but include various inorganic glass species such as float sheet glass, polished sheet glass, embossed sheet glass, net sheet glass, wire sheet glass, infrared absorption glass and colored sheet glass. These may be used singly or two or more different species may be used in combination. Laminates of a transparent inorganic glass sheet and a transparent organic glass sheet may also be used. The glass sheet thickness can be suitably selected according to the intended use, hence is not limited to any particular value.

The laminated glass of the present invention can be produced by employing any ordinary method of producing laminated glass. For example, the resin film formed by the above-mentioned method is sandwiched, as the interlayer, between two transparent glass sheets, the whole is placed in a rubber bag, preliminary bonding is effected at about 70 to 110° C. while suctioning under reduced pressure, then post-bonding is effected at about 120 to 150° C. under a pressure of about 10 to 15 kg/cm² using an autoclave or a press, whereby the objective laminated glass is obtained.

In a process for producing laminated glass, it is also possible to interpose the above-mentioned interlayer film prepared by sheet formation from the plasticized poly(vinyl butyral) resin between at least one pair of glass sheets, and hot-press bonding at 60 to 100° C. while simultaneously deaerating under reduced pressure. More concretely, the process is carried out by placing a laminate film consisting of a glass sheet/interlayer film/glass in a rubber bag, and effecting hot-press bonding at a temperature of about 60 to 100° C. under a pressure of about 1 to 10 kg/cm² for about 10 to 30 minutes in an autoclave, for instance, while deaerating under suction at a reduced pressure of about −500 to −700 mmHg, to thereby realize deaeration and bonding simultaneously.

In such production process, the bond strength between the interlayer film and glass can be adjusted so that said strength will fall within a desired adequate range by adjusting the temperature for hot-press bonding to the range of 60 to 100° C., as mentioned above, and suitably selecting various conditions, in particular the hot-press bonding pressure, hot-press bonding time and extent of pressure reduction for deaeration under suction within the respective ranges mentioned above.

BEST MODES FOR CARRYING OUT THE INVENTION

The following examples illustrate the present invention in further detail but are by no means limitative of the scope of the invention. In the examples, "part(s)" means "part(s) by weight".

EXAMPLE 1

(1) Preparation of a Resin

To 2890 g of pure water was added 275 g of a poly(vinyl alcohol) with an average polymerization degree of 1700 and a saponification degree of 98.9 mole %, and the mixture was warmed for dissolving. After the reaction system was adjusted to 12° C., 201 g of 35% hydrochloric acid catalyst and 148 g of n-butyraldehyde were added and the mixture was incubated at the same temperature to precipitate the reaction product.

The reaction mixture was then held at 45° C. for 3 hours to carry the reaction to completion. This reaction mixture was washed with an excess of water to remove the unreacted n-butyraldehyde and the catalyst hydrochloric acid was neutralized with aqueous sodium hydroxide solution, the common neutralizing agent. The product was rinsed with an excess of water for 2 hours and dried to provide a poly(vinyl butyral) resin as white powder. This resin had a vinyl acetal content (degree of acetalization) of 65.0 mole % and a vinyl acetate content of 1.1 mole %.

(2) Production of an Interlayer Film

The above poly(vinyl butyral) resin, 100 weight parts, was blended with 40 weight parts of the plasticizer triethylene glycol di-2-ethylbutyrate, and the blend was thoroughly melt-kneaded with a mixing roll and press-molded with a pressing machine at 150° C. for 30 minutes to provide an interlayer film of 0.76 mm in thickness. The particle diameters of sodium and potassium salts in the interlayer film were determined by secondary ion imaging with a time-of-flight secondary ion mass spectrometer (TOF-SIMS) (PHI EVANS; TFS-2000). As a result, the particle diameter of the sodium salt in the interlayer film was 1 $\mu$m and that of the potassium salt was less than 0.5 $\mu$m.

The elemental sodium content of this interlayer film was 6 ppm as measured by ICP emission spectrometry. ICP emission spectrometry is a quantitative method of analysis which comprises decomposing a sample with sulfuric acid and nitric acid under heating, making the decomposition product up to constant volume with ultrapure water, and performing a determination by the ICP-AES method using an ICP-AES (Jarrel-Ash Japan, ICAP-575).

(3) Production of a Laminated Glass

The above interlayer film was sandwiched between transparent float glass sheets (30 cm×30 cm×2.5 mm thick) and the assembly was placed in a rubber bag and deaerated under a vacuum of 20 Torr for 20 minutes. The sample thus deaerated was directly transferred to an oven at 90° C. and pressed under vacuum at a constant temperature of 80° C. for 30 minutes.

The prebonded laminated glass was autoclaved using a pneumatic autoclave at a pressure of 12 kg/cm$^2$ and a temperature of 135° C. for 20 minutes to provide a transparent laminated glass. This laminated glass was subjected to an adhesion test (Pummel test) and a moist blushing resistance test.

Performance Evaluation (1) Bonding power (Pummel) test

The laminated glass is left standing at −18° C.±0.6° C. for conditioning and then stricken with a hammer having a head weight of 0.45 kg to crush the glass to fragments with diameters not greater than 6 mm. The extent of exposure of the sheet after partial exfoliation of the glass is assessed against the graded limit samples shown in Table 1. This test is designed to find whether the bond strength between the glass and the interlayer film lies within a predetermined range.

TABLE 1

| Extent of exposure (%) | Pammer value |
|---|---|
| 100 | 0 |
| 90 | 1 |
| 85 | 2 |
| 60 | 3 |
| 40 | 4 |
| 20 | 5 |
| 10 | 6 |
| 5 | 7 |
| Less than 2 | 8 |

(2) Moist blushing resistance test

The resin film is cut to 4×4 cm and immersed in deionized water at room temperature (23° C.) for 24 hours. The haze value was then measured with an integral nephrometer (Tokyo Denshoku). The results are shown in Table 2.

EXAMPLE 2

The procedure of Example 1 was repeated except that, in the preparation of the resin, the washing process time following addition of the neutralizing agent was altered to 1.5 hours. In this case, the interlayer film obtained had an elemental sodium content of 13 ppm, a sodium salt particle diameter of 3 $\mu$m, and a potassium salt particle diameter of not greater than 0.5 $\mu$m.

EXAMPLE 3

The procedure of Example 1 was repeated except that, in the preparation of the resin, the washing process time following addition of the neutralizing agent was altered to 2.5 hours. In this case, the interlayer film obtained had an elemental sodium content of 3 ppm, a sodium salt particle diameter of 0.5 $\mu$m, and a potassium salt particle diameter of not greater than 0.5 $\mu$m.

EXAMPLE 4

The procedure of Example 1 was repeated except that, in the preparation of the resin, the washing process time following addition of the neutralizing agent was altered to 3.5 hours. In this case, the interlayer film obtained had an elemental sodium content of 0.9 ppm, a sodium salt particle diameter of not greater than 0.5 $\mu$m, and a potassium salt particle diameter of not greater than 0.5 $\mu$m.

COMPARATIVE EXAMPLE 1

The procedure of Example 1 was repeated except that, in the preparation of the resin, the washing process time following addition of the neutralizing agent was altered to 1 hours. In this case, the interlayer film obtained had an elemental sodium content of 17 ppm and a sodium salt particle diameter of 6 $\mu$m.

COMPARATIVE EXAMPLE 2

The procedure of Example 1 was repeated except that, in the preparation of the resin, the washing process time following addition of the neutralizing agent was altered to 0.5 hours. In this case, the interlayer film obtained had an elemental sodium content of 35 ppm and a sodium salt particle diameter of 13 μm.

The evaluation data generated in Examples 1 to 4 and Comparative Examples 1 and 2 are presented in Table 2.

TABLE 2

|  | Example | | | | Comp. Ex. | |
| --- | --- | --- | --- | --- | --- | --- |
|  | 1 | 2 | 3 | 4 | 1 | 2 |
| Interlayer film | | | | | | |
| Number of carbon in acetal | 4 | 4 | 4 | 4 | 4 | 4 |
| Degree of acetalization (mol %) | 65.0 | 65.0 | 65.0 | 65.0 | 65.0 | 65.0 |
| Average degree of polymerization | 1700 | 1700 | 1700 | 1700 | 1700 | 1700 |
| Vinylacetate content (mol %) | 1.1 | 1.1 | 1.1 | 1.1 | 1.1 | 1.1 |
| Plasticizer content (weight parts) | 40 | 40 | 40 | 40 | 40 | 40 |
| Na content (ppm) | 6 | 13 | 3 | 0.9 | 17 | 35 |
| Particle diameter of Na (μm) | 1 | 3 | 0.5 | 0.5> | 6 | 13 |
| K content (ppm) | 0.5 | 0.6 | 0.5 | 0.5 | — | — |
| Particle diameter of K (μm) | 0.5> | 0.5> | 0.5> | 0.5> | — | — |
| Bonding strength of a laminated glass (Pammer value) | 8 | 8 | 8 | 8 | 8 | 8 |
| Haze after 24 hours immersion (%) | 29 | 37 | 24 | 16 | 67 | 92 |
| Total evaluation | ◯ | ◯ | ◯ | ◯ | X | X |

It is apparent that very satisfactory moisture resistance was obtained in Examples 1 to 4.

EXAMPLE 5

(1) Preparation of a resin

To 2890 g of pure water was added 275 g of a poly(vinyl alcohol) with an average polymerization degree of 1700 and a saponification degree of 98.9 mole %, and the mixture was warmed for dissolving. After the reaction system was adjusted to 12° C., 201 g of 35% hydrochloric acid catalyst and 148 g of n-butyraldehyde were added and the mixture was incubated at the same temperature to precipitate the reaction product.

The reaction mixture was then held at 45° C. for 3 hours to carry the reaction to completion. This reaction mixture was washed with an excess (30 times the resin) of water to remove the unreacted n-butyraldehyde and the catalyst hydrochloric acid was neutralized with aqueous potassium hydroxide solution, the common neutralizing agent. The product was rinsed with an excess of water for 2 hours and dried to provide a poly(vinyl butyral) resin as white powder.

This resin had a vinylacetal content (degree of acetalization) of 65.0 mole % and a vinyl acetate content of 1.1 mole %.

(2) Production of an interlayer film

The above poly(vinyl butyral) resin, 100 weight parts, was blended with 40 weight parts of the plasticizer triethylene glycol di-2-ethylbutyrate, and the blend was thoroughly melt-kneaded with a mixing roll and press-molded with a pressing machine at 150° C. for 30 minutes to provide an interlayer film of 0.76 mm in thickness.

The elemental potassium content of this interlayer film was 23 ppm as measured by ICP emission spectrometry. The particle diameter of the sodium salt in the interlayer film was less than 0.5 μm and that of the potassium salt was less than 3 μm.

(3) Production of a laminated glass

The above interlayer film was sandwiched between transparent float glass sheets (30 cm×30 cm×2.5 mm thick) and the assembly was placed in a rubber bag and deaerated under a vacuum of 20 Torr for 20 minutes. The sample thus deaerated was directly transferred to an oven at 90° C. and pressed at a constant temperature of 80° C. for 30 minutes.

The prebonded laminated glass was autoclaved using a pneumatic autoclave at a pressure of 12 kg/cm$^2$ and a temperature of 135° C. for 20 minutes to provide a transparent laminated glass.

EXAMPLE 6

The procedure of Example 5 was repeated except that, in the preparation of the resin, the washing process time following addition of the neutralizing agent was altered to 2.5 hours. In this case, the interlayer film obtained had an elemental potassium content of 5 ppm, a potassium salt particle diameter of 1 μm, and a sodium salt particle diameter of not greater than 0.5 μm.

EXAMPLE 7

The procedure of Example 5 was repeated except that, in the preparation of the resin, the washing process time following addition of the neutralizing agent was altered to 3.5 hours. In this case, the interlayer film obtained had an elemental potassium content of 0.7 ppm, a potassium salt particle diameter of not greater than 0.5 μm, and a sodium salt particle diameter of not greater than 0.5 μm.

COMPARATIVE EXAMPLE 3

The procedure of Example 5 was repeated except that, in the preparation of the resin, the washing process time following addition of the neutralizing agent was altered to 1 hour. In this case, the interlayer film obtained had an elemental potassium content of 104 ppm and a potassium salt particle diameter of 6 μm.

COMPARATIVE EXAMPLE 4

The procedure of Example 5 was repeated except that, in the preparation of the resin, the washing process time following addition of the neutralizing agent was altered to 0.5 hour. In this case, the interlayer film obtained had an elemental potassium content of 220 ppm and a potassium salt particle diameter of 9 μm.

The laminated glasses obtained in Examples 5 to 8 and Comparative Examples 3 and 4 were respectively subjected to a bonding power (Pummel) test and a moisture resistance test under the same conditions as described above. The results of evaluation are collectively presented in Table 3.

TABLE 3

|  | Example | | | Comp. Ex. | |
| --- | --- | --- | --- | --- | --- |
|  | 5 | 6 | 7 | 3 | 4 |
| Interlayer film |  |  |  |  |  |
| Number of carbon in acetal | 4 | 4 | 4 | 4 | 4 |
| Degree of acetalization (mol %) | 65.0 | 65.0 | 65.0 | 65.0 | 65.0 |
| Avarage degree of polymerization | 1700 | 1700 | 1700 | 1700 | 1700 |
| Vinylacetate content (mol %) | 1.1 | 1.1 | 1.1 | 1.1 | 1.1 |
| Plasticizer content (weight parts) | 40 | 40 | 40 | 40 | 40 |
| K content (ppm) | 23 | 5 | 0.7 | 104 | 220 |
| Particle diameter of K ($\mu$m) | 3 | 1 | 0.5> | 6 | 9 |
| Na content (ppm) | 0.7 | 0.6 | 0.6 | — | — |
| Particle diameter of Na ($\mu$m) | 0.5> | 0.5> | 0.5> | — | — |
| Bonding strength of a laminated glass (Pammer value) | 8 | 8 | 8 | 8 | 7 |
| Haze after 24 hours of immersion (%) | 24 | 20 | 14 | 60 | 92 |
| Total evaluation | ◯ | ◯ | ◯ | X | X |

It will be apparent that very satisfactory moisture resistance was obtained in Examples 5 to 7.

EXAMPLE 8

(1) Preparation of a resin

To 2890 g of pure water was added 275 g of a poly(vinyl alcohol) with an average polymerization degree of 1700 and a saponification degree of 98.9 mole %, and the mixture was warmed for dissolving. After the reaction system was adjusted to 12° C., 201 g of 35% hydrochloric acid catalyst and 148 g of n-butyraldehyde were added and the mixture was incubated at the same temperature to precipitate the reaction product.

The reaction mixture was then held at 45° C. for 3 hours to carry the reaction to completion. This reaction mixture was washed with an excess of water to remove the unreacted n-butyraldehyde and the catalyst hydrochloric acid was neutralized with aqueous sodium hydroxide solution, the common neutralizing agent. The product was rinsed with an excess of water and dried to provide a poly(vinyl butyral) resin as white powder. This resin had a vinyl acetal content (degree of acetalization) of 65.0 mole %.

(2) Production of an interlayer film

The above polybutyral resin, 100 weight parts, was blended with 40 weight parts of the plasticizer triethylene glycol di-2-ethylbutyrate, and the mixture was press-molded with a pressing machine to provide an interlayer film. The elemental sodium content of this interlayer film as determined with an ICP emission spectrometric elemental analyzer was 13 ppm. The particle diameter of sodium salt in the interlayer film was 3 $\mu$m.

(3) Production of a laminated glass

The above interlayer film was sandwiched between two 2.5 mm thick float glass sheets and the assembly was placed in a rubber bag and effected hot-press bonding at a temperature of 60° C. and a pressure of 5 kg/cm² under suction degassing at a reduced pressure of −600 mmHg in an autoclave for 20 minutes to provide a laminated glass.

EXAMPLE 9

Except that the hot-press bonding temperature for the fabrication of a laminated glass was altered to 80° C., the procedure of Example 8 was otherwise repeated to provide a laminated glass. The particle diameter of the sodium salt in the interlayer film was 3 $\mu$m.

EXAMPLE 10

Except that the hot-press bonding temperature for the fabrication of a laminated glass was altered to 100° C., the procedure of Example 8 was otherwise repeated to provide a laminated glass. The particle diameter of the sodium salt in the interlayer film was 3 $\mu$m.

COMPARATIVE EXAMPLE 5

Except that the hot-press bonding temperature for the fabrication of a laminated glass was altered to 80° C., the procedure of Example 8 was otherwise repeated to provide a laminated glass. The sodium content of the obtained interlayer film was 30 ppm and the particle diameter of the sodium salt thereof was 11 $\mu$m.

The glass laminates obtained in Examples 8 to 10 and Comparative Example 5 were respectively subjected to a bonding power (Pummel) test and a heat resistance test under the following conditions. A moisture resistance test was also performed using the same conditions as in Example 1.

Evaluation Methods (1) Bonding power (Pummel) test

The laminated glass is cooled at −20° C. for 2 hours and, then, mounted on an automatic hammering machine. The whole surface of the laminated glass is uniformly strickened with the hammer head and the area of glass fragments adhering to the interlayer film is visually assessed against the graded limit samples shown in Table 1 to evaluate the bonding power (Pummel value). The graded limit sample is based on a 10-point scale giving 1 point for minimum adhesion and 10 points for maximum adhesion. The automatic hammering machine used is equipped with a hammer head having a curved bottom surface having a radius of curvature of 50 mm and an effective striking diameter of 5 mm and weighing 240 g and the impact force of the hammer head is adjustable with a spring screw.

(2) Heat resistance test

In conformity with JIS R3205 "Laminated Glass", the sample laminated glass is left standing in an atmosphere at 130° C. for 2 hours and then taken out and the presence or absence of air cells is visually examined.

The results obtained in Examples 8 to 10 and Comparative Example 5 are collectively shown in Table 4.

TABLE 4

|  | Example | | | Compar. Ex. |
| --- | --- | --- | --- | --- |
|  | 8 | 9 | 10 | 5 |
| Na content (ppm) | 13 | 13 | 13 | 30 |
| Particle diameter of Na ($\mu$m) | 3 | 3 | 3 | 11 |
| Bonding strength of the laminated glass (Pammer value) | 1 | 5 | 8 | 5 |
| Haze after 24 hours of immersion (%) | 37 | 38 | 33 | 66 |
| Presence or absence of air form after Heat resistance test | none | none | none | none |
| Total evaluation | ◯ | ◯ | ◯ | X |

EXAMPLE 11

(1) Preparation of a resin

To 2890 g of pure water was added 275 g of a poly(vinyl alcohol) with an average polymerization degree of 1700 and a saponification degree of 98.9 mole %, and the mixture was warmed for dissolving. After there action system was adjusted to 12° C., 201 g of 35% hydrochloric acid catalyst and 148 g of n-butyraldehyde were added and the mixture was incubated at the same temperature to precipitate the reaction product.

The reaction mixture was then held at 45° C. for 3 hours to carry the reaction to completion. This reaction mixture was washed with an excess (30 times the resin) of water to remove the unreacted n-butyraldehyde. The pH of the system at this stage was found to be pH 5.1. The system was then dehydrated with Centor dehydrating machine to provide a resin of 50% water content. This resin was dried in an atmosphere at 60° C. and −700 mmHg to provide a poly (vinyl butyral) resin as white powder. The acetalization rate of this resin was 65.0 mole %.

(2) Production of an interlayer film

The above poly(vinyl butyral) resin, 100 weight parts, was blended with 40 weight parts of the plasticizer triethylene glycol di-2-ethylbutyrate, and the mixture was press-molded with a pressing machine to provide an interlayer film. The elemental sodium content of this interlayer film as determined with an ICP emission spectrometric elemental analyzer was 0.7 ppm. The particle diameter of sodium salt in the interlayer film was less than 0.5 $\mu$m.

(3) Production of a laminated glass

The above interlayer film was sandwiched between two 2.5 mm thick float glass sheets and the assembly was placed in a rubber bag and hot-pressed at a temperature of 60° C. and a pressure of 5 kg/cm$^2$ under suction degassing at a reduced pressure of −600 mmHg in an autoclave for 20 minutes to provide a laminated glass.

EXAMPLE 12

(1) Preparation of a resin

To 2890 g of pure water was added 275 g of a poly(vinyl alcohol) with an average polymerization degree of 1700 and a saponification degree of 98.9 mole %, and the mixture was warmed for dissolving. After there action system was adjusted to 12° C., 201 g of 35% hydrochloric acid catalyst and 148 g of n-butyraldehyde were added and the mixture was incubated at the same temperature to precipitate the reaction product.

The reaction mixture was then held at 45° C. for 3 hours to carry the reaction to completion. This reaction mixture was washed with an excess (30 times the resin) of water to remove the unreacted n-butyraldehyde and the catalyst hydrochloric acid was neutralized with aqueous sodium hydroxide solution, the common neutralizing agent. Then, the reaction product was rinsed with an excess (30 times the resin) of water at 50° C. and dried to provide a poly(vinyl butyral) resin as white powder. The degree of acetalization of this resin was 65.0 mole %.

(2) Production of an interlayer film.

The above poly(vinyl butyral) resin, 100 weight parts, was blended with 40 weight parts of the plasticizer triethylene glycol di-2-ethylbutyrate, and the mixture was press-molded with a pressing machine to provide an interlayer film. The elemental sodium content of this interlayer film as determined with an ICP emission spectrometric elemental analyzer was 10 ppm. The particle diameter of sodium salt in the interlayer film was 3 $\mu$m.

(3) Production of a laminated glass

The above interlayer film was sandwiched between two 2.5 mm thick float glass sheets and the assembly was placed in a rubber bag and hot-pressed at a temperature of 60° C. and a pressure of 5 kg/cm$^2$ under suction degassing at a reduced pressure of −600 mmHg in an autoclave for 20 minutes to provide a laminated glass.

EXAMPLE 13

Except that post-neutralization washing was carried out with water at 60° C., the procedure of Example 12 was otherwise repeated to provide an interlayer film. The rate of acetalization of this interlayer film was 65.0 mole %. The elemental sodium content of this interlayer film was 15 ppm as determined with an ICP emission spectrometric elemental analyzer. The particle diameter of sodium salt in this interlayer film was 4 $\mu$m.

EXAMPLE 14

(1) Preparation of a resin

To 2890 g of pure water was added 275 g of a poly(vinyl alcohol) with an average polymerization degree of 1700 and a saponification degree of 98.9 mole %, and the mixture was warmed for dissolving. After there action system was adjusted to 12° C., 201 g of 35% hydrochloric acid catalyst and 148 g of n-butyraldehyde were added and the mixture was incubated at the same temperature to precipitate the reaction product.

The reaction mixture was then held at 45° C. for 3 hours to carry the reaction to completion. This reaction mixture was washed with an excess of water to remove the unreacted n-butyraldehyde and the catalyst hydrochloric acid was neutralized with aqueous magnesium hydroxide solution, the common neutralizing agent. The product was rinsed with an excess of water and dried to provide a poly(vinyl butyral) resin as white powder.

(2) Production of an interlayer film.

The above poly(vinyl butyral) resin, 100 weight parts, was blended with 40 weight parts of the plasticizer triethylene glycol di-2-ethylbutyrate, and the mixture was press-molded with a pressing machine to provide an interlayer film. The elemental sodium content of this interlayer film as determined with an ICP emission spectrometric elemental analyzer was 0.7 ppm. The particle diameter of sodium salt in the interlayer film was less than 0.5 $\mu$m.

(3) Production of a laminated glass

The above interlayer film was sandwiched between two 2.5 mm thick float glass sheets and the assembly was placed in a rubber bag and hot-pressed at a temperature of 60° C. and a pressure of 5 kg/cm$^2$ under suction degassing at a reduced pressure of −600 mmHg in an autoclave for 20 minutes to provide a laminated glass.

The glass laminates obtained above in Examples 11 to 14 were respectively subjected to the following heat resistance test. In addition, a moisture resistance test was carried out in the same manner as in Example 1. However, the product of Example 14 was subjected to the moisture resistance test only.

Methods of Evaluation (1) Heat resistance test

One gram of the resin was placed in an ordinary test tube and heated in an oil bath at 150° C. for 60 minutes to assess the possible degradation of the resin.

The data obtained in Examples 11 to 14 are collectively presented in Table 5.

TABLE 5

| | Example | | | |
|---|---|---|---|---|
| | 11 | 12 | 13 | 14 |
| Na content (ppm) | 0.7 | 10 | 15 | 0.7 |
| Particle diameter of Na (μm) | 0.5> | 3 | 4 | 0.5> |
| Heat resistance test | O.K. | O.K. | O.K. | — |
| Haze after 24 hours of immersion (%) | 13 | 32 | 39 | 24 |
| Total evaluation | ◯ | ◯ | ◯ | — |

EXAMPLE 15

(1) Preparation of a resin

To 2890 g of pure water was added 275 g of a poly(vinyl alcohol) with an average polymerization degree of 1700, a saponification degree of 98.9 mole % and 0.1 weight % of sodium acetate, and the mixture was warmed for dissolving. After the reaction system was adjusted to 12° C., 201 g of 35% hydrochloric acid catalyst and 148 g of n-butyraldehyde were added and the mixture was incubated at the same temperature to precipitate the reaction product.

The reaction mixture was then held at 45° C. for 3 hours to carry the reaction to completion. This reaction mixture was washed with an excess (30 times the resin) of water to remove the unreacted n-butyraldehyde and the catalyst hydrochloric acid was neutralized with aqueous sodium hydroxide solution, the common neutralizing agent. The product was rinsed with an excess of water and dried to provide a poly(vinyl butyral) resin as white powder.

The acetalization degree of this resin was 65 mole %.

(2) Production of an interlayer film

The above poly(vinyl butyral) resin, 100 weight parts, was blended with 40 weight parts of the plasticizer triethylene glycol di-2-ethylbutyrate and the mixture was press-molded with a pressing machine to provide an interlayer film. The elemental sodium content of this interlayer film was 8 ppm as determined with an ICP emission spectrometric elemental analyzer.

EXAMPLE 16

Except that 275 g of a poly(vinyl alcohol) with an average polymerization degree of 1700, a saponification degree of 98.9 mole %, and a sodium acetate content of 0.4 weight %, the procedure of Example 15 was otherwise repeated to provide an interlayer film. The degree of acetalization of this interlayer film was 65.0 mole %. The elemental sodium content of this interlayer film was 13 ppm as determined with an ICP emission spectrometric elemental analyzer.

EXAMPLE 17

(1) Preparation of a resin

To 2890 g of pure water was added 275 g of a poly(vinyl alcohol) with an average polymerization degree of 1700, a saponification degree of 98.9 mole % and a sodium acetate content of 0.1 weight %, and the mixture was warmed for dissolving. After the reaction system was adjusted to 12° C., 201 g of 35% hydrochloric acid catalyst and 148 g of n-butyraldehyde were added and the mixture was incubated at the same temperature to precipitate the reaction product.

The reaction mixture was then held at 45° C. for 3 hours to carry the reaction to completion. This reaction mixture was washed with an excess (30 times the resin) of water to remove the unreacted n-butyraldehyde and the catalyst hydrochloric acid was neutralized with magnesium octanoate. The product was rinsed with an excess of water and dried to provide a poly(vinyl butyral) resin as white powder. The acetalization degree of this resin was 65 mole %.

(2) Production of an interlayer film

The above poly(vinyl butyral) resin, 100 weight parts, was blended with 40 weight parts of the plasticizer triethylene glycol di-2-ethylbutyrate and the mixture was press-molded with a pressing machine to provide an interlayer film. The elemental sodium content of this interlayer film was 2 ppm as determined with an ICP emission spectrometric elemental analyzer.

EXAMPLE 18

Except that ethylene oxide was used as the neutralizer of the hydrochloric acid catalyst, the procedure of Example 17 was otherwise repeated to provide an interlayer film. The degree of acetalization of this interlayer film was 65 mole %. The elemental sodium content of this interlayer film was 2 ppm as determined with an ICP emission spectrometric elemental analyzer.

The interlayer films obtained in Examples 15-18 were respectively subjected to a heat resistance test as in Example 11 and a moisture resistance test as in Example 1. The results are presented in Table 6.

TABLE 6

| | Example | | | |
|---|---|---|---|---|
| | 15 | 16 | 17 | 18 |
| Sodium acetate content in poly(vinyl alcohol) (wt. %) | 0.1 | 0.4 | 0.1 | 0.1 |
| Na content (ppm) | 8 | 13 | 2 | 2 |
| Particle diameter of Na (μm) | 0.6 | 2 | 0.5> | 0.5> |
| Heat resistance test | O.K. | O.K. | O.K. | O.K. |
| Haze after 24 hours of immersion (%) | 19 | 35 | 11 | 10 |
| Total evaluation | ◯ | ◯ | ◯ | ◯ |

EXAMPLE 19

(1) Preparation of a poly(vinyl acetal) resin

To 2890 g of pure water was added 275 g of a poly(vinyl alcohol) with an average polymerization degree of 1700 and a saponification degree of 98.9 mole %, and the mixture was warmed for dissolving. After there action system was adjusted to 12° C., 201 g of 35% weight hydrochloric acid catalyst and 148 g of n-butyraldehyde were added and the mixture was incubated at the same temperature to precipitate the reaction product. The reaction mixture was then held at 45° C. for 3 hours to carry the reaction to completion. This reaction mixture was washed with an excess of water to remove the unreacted n-butyraldehyde and the catalyst hydrochloric acid was neutralized with aqueous sodium hydroxide solution, the common neutralizing agent. The product was rinsed with an excess of water for 2 hours and dried to provide a poly(vinyl butyral) resin as white powder. This resin had an average butyralization degree of 64 mole % and a residual acetyl group content of 1 mole %.

(2) Production of an interlayer film for laminated glass

To 100 parts of the above poly(vinyl butyral) resin (average degree of polymerization: 1700, average butyralization degree: 64 mole %, residual acetyl group content: 1 mole %) were added 40 parts of the plasticizer triethylene glycol di-2-ethylbutyrate and 0.08 part of magnesium octanoate as the bond strength control agent. The mixture was thoroughly melt-kneaded with a mixing roll and press-molded with a pressing machine at 150° C. for 30 minutes to provide an interlayer film for laminated glass having an average thickness of 0.76 mm.

This interlayer film for laminated glass had a sodium content of 10 ppm and a sodium salt particle diameter of 1 $\mu$m. The particle diameter of magnesium salt in the interlayer film was 0.9 $\mu$m as determined with a time-of-flight secondary ion mass spectrometer (TOF-SIMS).

(3) Production of a laminated glass

The above interlayer film for laminated glass was sandwiched between transparent float glass sheets (30 cm×30 cm×3 mm thick) and the assembly was placed in a rubber bag and deaerated under a vacuum of 20 Torr for 20 minutes. The deaerated assembly was directly transferred to an oven and pressed under vacuum at 90° C. for 30 minutes.

The prebonded laminated glass thus obtained was further subjected to post-bonding in a preumatic autoclave at a temperature of 135° C. and a pressure of 12 kg/cm$^2$ for 20 minutes to provide a laminated glass.

EXAMPLE 20

Except that, in the production of an interlayer film for laminated glass, 0.09 part of magnesium neodecanoate was used in lieu of 0.08 part of magnesium octanoate as the bond strength control agent, the procedure of Example 19 was otherwise repeated to provide an interlayer film for laminated glass and a laminated glass.

The particle diameter of magnesium salt in the interlayer film for laminated glass obtained in the above manner was 0.5 $\mu$m as determined by the same method as in Example 19.

EXAMPLE 21

Except that, in the production of an interlayer film for laminated glass, 0.04 part of magnesium chloride was used in lieu of 0.08 part of magnesium octanoate as the bond strength control agent, the procedure of Example 19 was otherwise repeated to provide an interlayer film for laminated glass and a laminated glass.

The particle diameter of magnesium salt in the interlayer film for laminated glass obtained in the above manner was 2 $\mu$m as determined by the same method as in Example 19.

EXAMPLE 22

Except that, in the production of a poly(vinyl acetal) resin, basic magnesium carbonate was used in lieu of aqueous sodium hydroxide solution as the neutralizing agent, the procedure of Example 19 was otherwise repeated to provide a white powdery poly(vinyl butyral) resin with an average polymerization degree of 1700, an average butyralization degree of 64 mole %, and a residual acetyl group content of 1 mole %.

Then, an interlayer film for laminated glass and a laminated glass were prepared in substantially the same manner as in Example 19 except that, in the preparation of the interlayer film for laminated glass, 100 parts of the above poly(vinyl butyral) resin was used in lieu of 100 parts of the poly(vinyl butyral) resin prepared in Example 19 and the addition of 0.08 part of magnesium octanoate as the bond strength control agent was omitted.

This interlayer film had a sodium content of 0.7 ppm and a sodium salt particle diameter of not greater than 0.5 $\mu$m. The particle diameter of magnesium salt in this interlayer film was 2 $\mu$m as determined in the same manner as in Example 19.

EXAMPLE 23

Except that, in the preparation of poly(vinyl acetal) resin, aqueous magnesium hydroxide solution was used in lieu of aqueous sodium hydroxide solution as the neutralizing agent, the procedure of Example 19 was otherwise repeated to provide a white powdery poly(vinyl butyral) resin with an average polymerization degree of 1700, an average butyralization degree of 64 mole % and a residual acetyl group content of 1 mole %.

Then, an interlayer film for laminated glass and a laminated glass were prepared in substantially the same manner as in Example 19 except that 100 parts of the above poly(vinyl butyral) resin was used in lieu of 100 parts of the poly(vinyl butyral) resin obtained in Example 19 and the addition of 0.08 part of magnesium octanoate as the bond strength control agent was omitted in the preparation of the interlayer film.

This interlayer film had a sodium content of 0.7 ppm and a sodium salt particle diameter of not greater than 0.5 $\mu$m. The particle diameter of magnesium salt in this interlayer film was 2.5 $\mu$m as determined in the same manner as in Example 19.

COMPARATIVE EXAMPLE 6

Except that 0.04 part of magnesium acetate, which is sparingly soluble in poly(vinyl butyral) resin and plasticizer, was used in lieu of 0.08 part of magnesium octanoate as the bond strength control agent in the preparation of an interlayer film for laminated glass, the procedure of Example 19 was otherwise repeated to provide an interlayer film for laminated glass and a laminated glass.

The particle diameter of magnesium salt in the interlayer film for laminated glass obtained in the above manner was 10 $\mu$m as determined by the same method as in Example 19.

COMPARATIVE EXAMPLE 7

Except that 0.04 part of magnesium acetate which is sparingly soluble in poly(vinyl butyral) resin and plasticizer and 0.05 parts of butylic acid which is short-chain organic acid were used in lieu of 0.08 part of magnesium octanoate as the bond strength control agent in the preparation of an interlayer film for laminated glass, the procedure of Example 19 was otherwise repeated to provide an interlayer film for laminated glass and a laminated glass.

The particle diameter of magnesium salt in the interlayer film for laminated glass obtained in the above manner was 4 $\mu$m as determined by the same method as in Example 19.

The interlayer film for laminated glasses obtained in Examples 19 to 23 and Comparative Examples 6 and 7 were respectively subjected to a moisture resistance test as in Example 1. The results are presented in Table 7.

TABLE 7

|  | Example | | | | | Comp. Ex. | |
| --- | --- | --- | --- | --- | --- | --- | --- |
|  | 19 | 20 | 21 | 22 | 23 | 6 | 7 |
| Number of carbon in acetal | 4 | 4 | 4 | 4 | 4 | 4 | 4 |
| Avarage degree of butyralization (mole %) | 64.0 | 64.0 | 64.0 | 64.0 | 64.0 | 64.0 | 64.0 |
| Residual acetyl group content (mole %) | 1.0 | 1.0 | 1.0 | 1.0 | 1.0 | 1.0 | 1.0 |
| Avarage degree of polymerization | 1700 | 1700 | 1700 | 1700 | 1700 | 1700 | 1700 |
| Plasticizer (wt. parts) | 40 | 40 | 40 | 40 | 40 | 40 | 40 |
| Na content (ppm) | 10 | 10 | 10 | 0.7 | 0.7 | 10 | 10 |
| Particle diameter of Na ($\mu$m) | 1.0 | 1.0 | 1.0 | 0.5> | 0.5> | 1.0 | 1.0 |
| Addition amount of magnesium salt (wt. parts) | 0.08 | 0.09 | 0.04 | 0 | 0 | 0.04 | 0.04 |
| Particle diameter of magnesium salt ($\mu$m) | 0.9 | 0.5 | 2.0 | 2.0 | 2.5 | 10.0 | 4.0 |
| Haze after 24 hours of immesion (%) | 19.0 | 16.4 | 26.8 | 28.4 | 38.3 | 92.0 | 67.2 |
| Tatal evaluation | ○ | ○ | ○ | ○ | ○ | X | X |

It will be apparent from Table 7 that the laminated glasses according to Examples 19 to 23 of the invention have excellent moisture resistance. In contrast, the glass laminates according to Comparative Examples 6 and 7, in which the particle diameters of magnesium salt contained in the interlayer films were over 3 am, showed poor moisture resistance.

EXAMPLE 24

Synthesis and Production
Synthesis of poly(vinyl butyral) Resin

A reactor equipped with a stirring means was charged with 2900 weight parts of deionized water and 198 weight parts of a poly(vinyl alcohol) with an average polymerization degree of 1700 and a saponification degree of 99.2 mole % (corresponding to 4.5 mols of vinyl alcohol) and the charge was heated to 95° C. with stirring for dissolving. After this solution was cooled to 30° C., 208 weight parts (2.1 moles) of 35 weight % hydrochloric acid and 152 weight parts (2.1 moles) of n-butyraldehyde were added. After the liquid temperature was lowered to 2° C., the reaction system was maintained at this temperature to precipitate the poly(vinyl butyral) resin. The liquid temperature was then raised to 30° C. and maintained at this level for 5 hours. Thereafter, the reaction mixture was neutralized with 156 weight parts (1.8 moles) of sodium hydrogencarbonate, washed with water and dried to provide a poly(vinyl butyral) resin with a butyralization degree of 65 mole %.

The sodium content of this poly(vinyl butyral) resin was 50 ppm as determined by ICP emission spectrometry. The particle diameter of the sodium salt was 12 $\mu$m.

Production of a Resin Film

One hundred (100) weight parts of the poly(vinyl butyral) resin obtained as above, 40 weight parts of triethylene glycol di-2-ethylbutyrate, 0.05 weight part of ethylenediaminetetraacetic acid, 0.04 weight part of magnesium 2-ethylbutyrate and 0.05 weight part of modified silicone oil were fed to a mixing roll and kneaded. Using a pressing machine, this kneaded material was press-molded at 150° C. and 120 kg/cm² for 30 minutes to provide a resin film of 0.8 mm in thickness. This resin film was subjected to a moisture resistance test as in Example 1.

As the modified silicone oil, the oil of the following chemical formula was used.

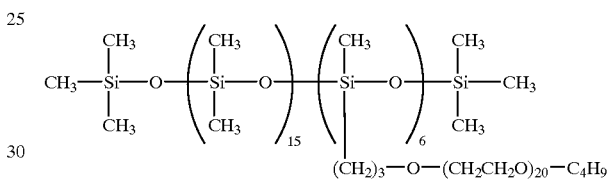

EXAMPLE 25

A resin film was prepared and evaluated in the same manner as in Example 24 except that 0.08 weight part of salicylaldehyde was used in lieu of 0.05 weight part of ethylenediaminetetraacetic acid. The results are shown in Table 8.

EXAMPLE 26

A resin film was prepared and evaluated in the same manner as in Example 24 except that 1.0 weight part of oxalic acid was used in lieu of 0.05 weight part of ethylenediaminetetraacetic acid. The results are shown in Table 8.

EXAMPLE 27

A resin film was prepared and evaluated in the same manner as in Example 24 except that 0.03 weight part of 1,10-phenanthroline was used in lieu of 0.05 weight part of ethylenediaminetetraacetic acid. The results are shown in Table 8.

EXAMPLE 28

A resin film was prepared and evaluated in the same manner as in Example 24 except that 0.3 weight part of acetylacetone was used in lieu of 0.05 weight part of ethylenediaminetetraacetic acid. The results are shown in Table 8.

COMPARATIVE EXAMPLE 8

A resin film was prepared and evaluated in the same manner as in Example 24 except that 0.05 weight part of ethylenediaminetetraacetic acid was not used. The results are shown in Table 8.

COMPARATIVE EXAMPLE 9

A resin film was prepared and evaluated in the same manner as in Example 24 except that 0.3 weight part of acetone was used in lieu of 0.05 weight part of ethylenediaminetetraacetic acid. The results are shown in Table 8.

The prebonded glass thus obtained was subjected to post-bonding in a pneumatic autoclave at 135° C. and 12 kg/cm$^2$ for 20 minutes to provide a laminated glass.

The interlayer film for laminated glass thus obtained was subjected to a moisture resistance test as in Example 1. The results are shown in Table 9.

TABLE 8

| | | Butyral resin (wt. parts) | Diester compound (wt. parts) | Complex forming compound kind | Complex forming compound wt. | Mg salt of carboxylate (wt.) | Modified silicone oil (wt.) | Haze after 24 hours of immersion (%) |
|---|---|---|---|---|---|---|---|---|
| Example | 24 | 100 | 40 | Ethylenediamin-tetraacetic acid | 0.05 | 0.04 | 0.05 | 26.0 |
| | 25 | 100 | 40 | Salicylaldehyde | 0.08 | 0.04 | 0.05 | 29.5 |
| | 26 | 100 | 40 | oxalic acid | 1.0 | 0.04 | 0.05 | 35.6 |
| | 27 | 100 | 40 | 1,10-phenanthroline | 0.03 | 0.04 | 0.05 | 39.5 |
| | 28 | 100 | 40 | acethylacetone | 0.3 | 0.04 | 0.05 | 36.9 |
| Compar. Example | 8 | 100 | 40 | none | — | — | 0.05 | 77.0 |
| | 9 | 100 | 40 | acetone | 0.1 | — | 0.05 | 92.0 |

EXAMPLE 29

(1) Preparation of poly(vinyl acetal) resin

In 2890 of pure water was dissolved 275 g of a poly(vinyl alcohol) having an average polymerization degree of 1700 and a saponification degree of 98.9 mole % under heating. After this reaction system was adjusted to 12° C., 201 g of 35 weight % hydrochloric acid catalyst and 148 g of n-butyraldehyde were added and the mixture was incubated at this temperature to precipitate the reaction product. This reaction system was held at 45° C. for 3 hours to carry the reaction to completion. The reaction mixture was then washed with an excess of water to remove the unreacted n-butyraldehyde and the hydrochloric acid catalyst was neutralized with aqueous sodium hydroxide solution, the common neutralizing agent. The product was rinsed with an excess of water for 2 hours and dried to provide a white powdery poly(vinyl butyral) resin. This resin had an average butyralization degree of 64 mole % and a resin acetyl group content of 1 mole %.

(2) Production of an interlayer film for laminated glass

To 100 parts of the above poly(vinyl butyral) resin (average polymerization degree: 1700, average butyralization degree: 64 mole %, residual acetyl group content: 1 mole %) were added 40 parts of the plasticizer triethylene glycol di-2-ethylbutyrate, 0.75 part of dodecylbenzenesulfonic acid as the organic acid and 0.13 part of dimethyloctylamine as the amine. The mixture was thoroughly melt-kneaded with a mixing roll and press-molded with a pressing machine at 150° C. for 30 minutes to provide an interlayer film for laminated glass having an average thickness of 0.76 mm.

The sodium content of the above interlayer film was 50 ppm as determined by ICP emission spectrometry. The particle diameter of elemental sodium in the interlayer film was 4 µm as determined by time-of-flight secondary ion mass spectrometry (TOF-SIMS).

(3) Production of a laminated glass

The above interlayer film was sandwiched between two transplant float glass sheets (30 cm×30 cm×3 mm thick) and the assembly was placed in a rubber bag and deaerated under a vacuum of 20 Torr for 20 minutes. The deaerated assembly was immediately transferred to an oven at 90° C. and pressed under suction at a constant temperature of 80° C. for 30 minutes.

EXAMPLE 30

A resin film was prepared and evaluated as in Example 29 except that 0.30 part of octanoic acid was added in lieu of 0.75 part of dodecylbenzenesulfonic acid as the organic acid and 0.35 part of decylamine in lieu of 0.13 part of dimethyloctylamine as the amine in the preparation of the interlayer film for laminated glass. The results are shown in Table 9.

The particle diameter of the elemental sodium in the above interlayer film was 5 µm as determined in the same manner as in Example 29.

EXAMPLE 31

A resin film was prepared and evaluated as in Example 29 except that 0.20 part of di(2-ethylhexyl)phosphoric acid was added in lieu of 0.75 part of dodecylbenzenesulfonic acid as the organic acid in the preparation of the interlayer film for laminated glass. The results are shown in Table 9.

The particle diameter of the elemental sodium in the interlayer film was 2 µm as determined by the same method as in Example 29.

COMPARATIVE EXAMPLE 10

A resin film was prepared and evaluated as in Example 29 except that the dispersant organic acid and amine were not added in the preparation of the interlayer film for laminated glass. The results are shown in Table 9.

The particle diameter of the elemental sodium in the above interlayer film was 20 µm as determined in the same manner as in Example 29.

COMPARATIVE EXAMPLE 11

A resin film was prepared and evaluated as in Example 29 except that the addition of the dispersant organic acid and amine was omitted and the washing time was altered from 2 hours to 3 hours in the preparation of the interlayer film for laminated glass. The results are shown in Table 9.

The sodium content of the interlayer film was 30 ppm as determined by the same procedure as in Example 29. The particle diameter of the elemental sodium as determined by the same method as in Example 29 was 13 µm.

TABLE 9

|  | Example | | | Comp. Ex. | |
| --- | --- | --- | --- | --- | --- |
|  | 29 | 30 | 31 | 10 | 11 |
| Interlayer film | | | | | |
| Number of carbon in acetal | 4 | 4 | 4 | 4 | 4 |
| Avarage degree of butyralization (mole %) | 64.0 | 64.0 | 64.0 | 64.0 | 64.0 |
| Residual acetyl group content (mole %) | 1.0 | 1.0 | 1.0 | 1.0 | 1.0 |
| Avarage degree of polymerization | 1700 | 1700 | 1700 | 1700 | 1700 |
| Plasticizer (wt. parts) | 40 | 40 | 40 | 40 | 40 |
| Na content (ppm) | 50 | 50 | 50 | 50 | 30 |
| Particle diameter of Na ($\mu$m) | 4 | 5 | 2 | 20 | 13 |
| Haze after 24 hours of immesion (%) | 26 | 28 | 20 | 92 | 72 |
| Tatal evaluation | ◯ | ◯ | ◯ | X | X |

EXAMPLE 32

Synthesis and Sheet Formation

Synthesis of poly(vinyl butyral) Resin

A reactor equipped with a stirring means was charged with 2900 weight parts of deionized water, 198 weight parts of a poly(vinyl alcohol) having an average polymerization degree of 1700 and a saponification degree of 99.2 mole % (corresponding to 4.5 moles of vinyl alcohol) and the charge was heated at 95° C. with stirring for dissolving. After this solution was cooled to 30° C., 196 weight parts (1.9 moles) of 35 weight % hydrochloric acid and 152 weight parts (2.1 moles) of n-butyraldehyde were added. After the liquid temperature was lowered to 2° C., the reaction mixture was incubated at this temperature to precipitate the poly(vinyl butyral) resin. The liquid temperature was then raised to 30° C. and maintained at this level for 5 hours. Thereafter, the reaction mixture was neutralized with 147 weight parts (1.7 moles) of sodium hydrogencarbonate, washed with water and dried to provide a poly(vinyl butyral) resin with a butyralization degree of 65 mole %.

The sodium content of this poly(vinyl butyral) resin was 50 ppm as determined by ICP emission spectrometry. The particle diameter of sodium salt was 12 $\mu$m.

Preparation of a Resin Film

One hundred (100) weight parts of the above poly(vinyl butyral) resin, 40 weight parts of triethylene glycol di-2-ethylbutyrate, 0.43 weight part of p-toluenesulfonic acid and 0.23 weight part of hexylamine were fed to a mixing roll and kneaded. This kneaded material was press-molded with a pressing machine at 150° C. and 120 kg/cm² for 10 minutes to provide a resin film of 0.8 mm in thickness. This resin film was subjected to a moist blushing resistance test as in Example 1. The results are shown in Table 10.

EXAMPLE 33

A resin film was prepared and evaluated as in Example 32 except that 0.49 weight part of tetradecylamine was used in lieu of 0.23 weight part of hexylamine. The results are shown in Table 10.

EXAMPLE 34

A resin film was prepared and evaluated as in Example 32 except that 0.75 weight part of dodecylbenzenesulfonic acid was used in lieu of 0.43 weight % of p-toluenesulfonic acid. The results are shown in Table 10.

EXAMPLE 35

A resin film was prepared and evaluated as in Example 32 except that 0.15 weight part of dodecylbenzenesulfonic acid and 0.07 weight part of decylamine were used in lieu of 0.43 weight part of p-toluenesulfonic acid and 0.23 weight part of hexylamine. The results are shown in Table 10.

EXAMPLE 36

A resin film was prepared and evaluated as in Example 32 except that 0.75 weight part of dodecylbenzenesulfonic acid and 0.36 weight part of decylamine were used in lieu of 0.43 weight part of p-toluenesulfonic acid and 0.23 weight part of hexylamine. The results are shown in Table 10.

EXAMPLE 37

A resin film was prepared and evaluated as in Example 32 except that 0.75 weight part of dodecylbenzenesulfonic acid and 0.42 weight part of dodecylamine were used in lieu of 0.43 weight part of p-toluenesulfonic acid and 0.23 weight part of hexylamine. The results are shown in Table 10.

EXAMPLE 38

A resin film was prepared and evaluated as in Example 32 except that 0.75 weight part of dodecylbenzenesulfonic acid and 0.55 weight part of N,N-dioctylamine were used in lieu of 0.43 weight part of p-toluenesulfonic acid and 0.23 weight part of hexylamine. The results are shown in Table 10.

EXAMPLE 39

A resin film was prepared and evaluated as in Example 32 except that 0.37 weight part of dodecylbenzenesulfonic acid and 0.18 weight part of N,N-dimethyloctylamine were used in lieu of 0.43 weight part of p-toluenesulfonic acid and 0.23 weight part of hexylamine. The results are shown in Table 10.

EXAMPLE 40

A resin film was prepared and evaluated as in Example 32 except that 0.75 weight part of dodecylbenzenesulfonic acid and 0.36 weight part of N,N-dimethyloctylamine were used in lieu of 0.43 weight part of p-toluenesulfonic acid and 0.23 weight part of hexylamine. The results are shown in Table 10.

EXAMPLE 41

A resin film was prepared and evaluated as in Example 32 except that 0.75 weight part of dodecylbenzenesulfonic acid and 0.49 weight part of N,N-dimethyldodecylamine were used in lieu of 0.43 weight part of p-toluenesulfonic acid and 0.23 weight part of hexylamine. The results are shown in Table 10.

COMPARATIVE EXAMPLE 12

A resin film was prepared and evaluated as in Example 32 except that the addition of 0.43 weight part of p-toluenesulfonic acid and 0.23 weight part of hexylamine was omitted. The results are shown in Table 10.

COMPARATIVE EXAMPLE 13

A resin film was prepared and evaluated as in Example 32 except that the addition of 0.43 weight part of p-toluenesulfonic acid was omitted and 0.36 weight part of decylamine was used in lieu of 0.23 weight part of hexylamine. The results are shown in Table 10.

COMPARATIVE EXAMPLE 14

A resin film was prepared and evaluated as in Example 32 except that the addition of 0.23 weight part of hexylamine was omitted. The results are shown in Table 10.

COMPARATIVE EXAMPLE 15

A resin film was prepared and evaluated as in Example 32 except that 0.80 weight part of sodium dodecylbenzenesulfonate was used in lieu of 0.43 weight part of p-toluenesulfonic acid and 0.23 weight part of hexylamine. The results are shown in Table 10.

COMPARATIVE EXAMPLE 16

A resin film was prepared and evaluated as in Example 32 except that 0.33 weight part of dodecyltrimethylammonium chloride was used in lieu of 0.43 weight part of p-toluenesulfonic acid and 0.23 weight part of hexylamine. The results are shown in Table 10.

and 0.09 weight part of decylamine were used in lieu of 0.33 weight part of dodecylbenzenesulfonic acid and 0.17 weight part of decylamine.

EXAMPLE 44

A resin film was prepared and evaluated as in Example 42 except that 0.03 weight part of dodecylbenzenesulfonic acid and 0.02 weight part of decylamine were used in lieu of 0.33 weight part of dodecylbenzenesulfonic acid and 0.17 weight part of decylamine.

EXAMPLE 45

A resin film was prepared and evaluated as in Example 42 except that 0.17 weight part of N,N-dimethyloctylamine was used in lieu of 0.17 weight part of decylamine. The results are shown in Table 11.

EXAMPLE 46

A resin film was prepared and evaluated as in Example 42 except that 0.17 weight part of dodecylbenzenesulfonic acid and 0.09 weight part of N,N-dimethyloctylamine were used

TABLE 10

| | | Sulfonic acid | | Amine | | | | Haze after 24 |
|---|---|---|---|---|---|---|---|---|
| | | Kind | addition amount | $R^5$ | $R^6$ | $R^7$ | addition amount | hours of immersion (%) |
| Example | 32 | p-toluenesulfonic acid | 0.43 | hexyl | H | H | 0.23 | 29.1 |
| | 33 | p-toluenesulfonic acid | 0.43 | tetra-decyl | H | H | 0.49 | 18.6 |
| | 34 | dodecylbenzenesulfonic acid | 0.75 | hexyl | H | H | 0.23 | 22.8 |
| | 35 | dodecylbenzenesulfonic acid | 0.15 | decyl | H | H | 0.07 | 27.8 |
| | 36 | dodecylbenzenesulfonic acid | 0.75 | decyl | H | H | 0.36 | 17.1 |
| | 37 | dodecylbenzenesulfonic acid | 0.75 | dodecyl | H | H | 0.42 | 20.1 |
| | 38 | dodecylbenzenesulfonic acid | 0.75 | octyl | octyl | H | 0.55 | 32.4 |
| | 39 | dodecylbenzenesulfonic acid | 0.37 | octyl | methyl | methyl | 0.18 | 29.3 |
| | 40 | dodecylbenzenesulfonic acid | 0.75 | octyl | methyl | methyl | 0.36 | 23.1 |
| | 41 | dodecylbenzenesulfonic acid | 0.75 | dodecyl | methyl | methyl | 0.49 | 29.1 |
| Compar. | 12 | — | 0 | — | — | — | 0 | 77.6 |
| Example | 13 | — | 0 | decyl | H | H | 0.36 | 85.9 |
| | 14 | p-toluenesulfonic acid | 0.43 | — | — | — | 0 | resin degradation |
| | 15 | Sodium dodecylbenzenesulfonate | | | | | 0.80 | 76.8 |
| | 16 | Dodecyltrimethylammonium chloride | | | | | 0.33 | 60.6 |

EXAMPLE 42

(Preparation of a poly(vinyl butyral) resin)

The poly(vinyl butyral) resin synthesized in Example 32 was further rinsed with water and dried to provide a poly(vinyl butyral) resin with reduced sodium salt content.

The sodium content of this poly(vinyl butyral) resin was 20 ppm as determined by ICP emission spectrometry. The particle diameter of the sodium salt was 3.5 $\mu$m.

Preparation of a Resin Film

One-hundred (100) weight parts of the poly(vinylbutyral) resin obtained above, 40 weight parts of triethylene glycol di-2-ethylbutyrate, 0.33 weight part of dodecylbenzenesulfonic acid and 0.17 weight part of decylamine were kneaded together and press-molded under the same conditions as used in Example 32 to provide a resin film of 0.8 mm in thickness. This resin film was subjected to a moist blushing test as in Example 1. The results are shown in Table 11.

EXAMPLE 43

A resin film was prepared and evaluated as in Example 42 except that 0.17 weight part of dodecylbenzenesulfonic acid in lieu of 0.33 weight part of dodecylbenzenesulfonic acid and 0.17 weight part of decylamine. The results are shown in Table 11.

EXAMPLE 47

A resin film was prepared and evaluated as in Example 42 except that 0.03 weight part of dodecylbenzenesulfonic acid and 0.02 weight part of N,N-dimethyloctylamine were used in lieu of 0.33 weight part of dodecylbenzenesulfonic acid and 0.17 weight part of decylamine. The results are shown in Table 11.

EXAMPLE 48

A resin film was prepared and evaluated as in Example 42 except that 0.30 weight part of dodecylbenzenesulfonic acid and 0.20 weight part of N,N-dimethyldodecylamine were used in lieu of 0.33 weight part of dodecylbenzenesulfonic acid and 0.17 weight part of decylamine. The results are shown in Table 11.

EXAMPLE 49

A resin film was prepared and evaluated as in Example 42 except that 0.12 weight part of dodecylbenzenesulfonic acid and 0.08 weight part of N,N-dimethyldodecylamine were used in lieu of 0.33 weight part of dodecylbenzenesulfonic acid and 0.17 weight part of decylamine. The results are shown in Table 11.

COMPARATIVE EXAMPLE 17

A resin film was prepared and evaluated as in Example 42 except that the addition of 0.33 weight part of dodecylbenzenesulfonic acid and 0.17 weight part of decylamine were omitted. The results are shown in Table 11.

COMPARATIVE EXAMPLE 18

A resin film was prepared and evaluated as in Example 42 except that the addition of 0.33 weight part of dodecylbenzenesulfonic acid was omitted and that 0.36 weight part of decylamine was used in lieu of 0.17 weight part of decylamine. The results are shown in Table 11.

COMPARATIVE EXAMPLE 19

A resin film was prepared and evaluated as in Example 42 except that 0.30 weight part of dodecylbenzenesulfonic acid was used in lieu of 0.33 weight part of dodecylbenzenesulfonic acid and 0.17 weight part of decylamine. The results are shown in Table 11.

COMPARATIVE EXAMPLE 20

A resin film was prepared and evaluated as in Example 42 except that 0.50 weight part of sodium dodecylbenzenesulfonate was used in lieu of 0.33 weight part of dodecylbenzenesulfonic acid and 0.17 weight part of decylamine. The results are shown in Table 11.

COMPARATIVE EXAMPLE 21

A resin film was prepared and evaluated as in Example 42 except that 0.50 weight part of dodecyltrimethylammonium chloride was used in lieu of 0.33 weight part of dodecylbenzenesulfonic acid and 0.17 weight part of decylamine. The results are shown in Table 11.

Example 32 to provide a resin film of 0.8 mm in thickness. This resin film was subjected to a moist blushing test as in Example 1. The results are shown in Table 12.

EXAMPLE 51

A resin film was prepared and evaluated as in Example 50 except that 0.40 weight part of dodecylamine was used in lieu of 0.35 weight part of decylamine. The results are shown in Table 12.

EXAMPLE 52

A resin film was prepared and evaluated as in Example 50 except that 0.45 weight part of tetradecylamine was used in lieu of 0.35 weight part of decylamine. The results are shown in Table 12.

EXAMPLE 53

A resin film was prepared and evaluated as in Example 50 except that 0.50 weight part of myristic acid and 0.40 weight part of dodecylamine were used in lieu of 0.30 weight part of octanoic acid and 0.35 weight part of decylamine. The results are shown in Table 12.

EXAMPLE 54

A resin film was prepared and evaluated as in Example 50 except that 0.45 weight part of N,N-dimethyldodecylamine was used in lieu of 0.35 weight part of decylamine. The results are shown in Table 12.

EXAMPLE 55

A resin film was prepared and evaluated as in Example 50 except that 0.30 weight part of benzoic acid and 0.40 weight part of dodecylamine were used in lieu of 0.30 weight part of octanoic acid and 0.35 weight part of decylamine. The results are shown in Table 12.

TABLE 11

| | | Sulfonic acid | | Amine | | | | Haze after 24 |
| --- | --- | --- | --- | --- | --- | --- | --- | --- |
| | | kind | addition amount | $R^5$ | $R^6$ | $R^7$ | addition amount | hours of immersion (%) |
| Example | 42 | dodecylbenzenesulfonic acid | 0.33 | decyl | H | H | 0.17 | 18.8 |
| | 43 | dodecylbenzenesulfonic acid | 0.17 | decyl | H | H | 0.09 | 12.5 |
| | 44 | dodecylbenzenesulfonic acid | 0.03 | decyl | H | H | 0.02 | 17.2 |
| | 45 | dodecylbenzenesulfonic acid | 0.33 | octyl | methyl | methyl | 0.17 | 10.4 |
| | 46 | dodecylbenzenesulfonic acid | 0.17 | octyl | methyl | methyl | 0.09 | 11.2 |
| | 47 | dodecylbenzenesulfonic acid | 0.03 | octyl | methyl | methyl | 0.02 | 13.6 |
| | 48 | dodecylbenzenesulfonic acid | 0.30 | dodecyl | methyl | methyl | 0.20 | 16.4 |
| | 49 | dodecylbenzenesulfonic acid | 0.12 | dodecyl | methyl | methyl | 0.08 | 17.2 |
| Compar. | 17 | — | 0 | — | — | — | 0 | 33.4 |
| Example | 18 | — | 0 | decyl | H | H | 0.36 | 59.2 |
| | 19 | dodecylbenzenesulfonic acid | 0.30 | — | — | — | 0 | resin degradation |
| | 20 | Sodium dodecylbenzenesulfonate | | | | | 0.50 | 68.4 |
| | 21 | Dodecyltrimethylammonium chloride | | | | | 0.50 | 54.7 |

EXAMPLE 50

One-hundred (100) weight parts of the poly(vinyl butyral) resin synthesized in Example 32, 40 weight parts of triethylene glycol di-2-ethylbutyrate, 0.30 weight part of octanoic acid and 0.35 weight part of decylamine were kneaded together and press-molded under the same conditions as in

COMPARATIVE EXAMPLE 22

A resin film was prepared and evaluated as in Example 50 except that the addition of 0.35 weight part of decylamine was omitted. The results are shown in Table 12.

TABLE 12

|  |  | Carboxylic acid | | Amine | | | | Haze after 24 |
|---|---|---|---|---|---|---|---|---|
|  |  | kind | addition amount | $R^5$ | $R^6$ | $R^7$ | addition amount | hours of immersion (%) |
| Example | 50 | octanoic acid | 0.30 | decyl | H | H | 0.35 | 23.4 |
|  | 51 | octanoic acid | 0.30 | dodedyl | H | H | 0.40 | 24.9 |
|  | 52 | octanoic acid | 0.30 | tetra-decyl | H | H | 0.45 | 23.7 |
|  | 53 | myristic acid | 0.50 | dodecyl | H | H | 0.40 | 29.6 |
|  | 54 | octanoic acid | 0.30 | dodecyl | methyl | methyl | 0.45 | 29.6 |
|  | 55 | benzoic acid | 0.30 | dodecyl | H | H | 0.40 | 27.0 |
| Compar. Example | 22 | octanoic acid | 0.30 | — | — | — | 0 | 75.0 |

EXAMPLE 56

One-hundred (100) weight parts of the poly(vinyl butyral) resin prepared in Example 42, 40 weight parts of triethylene glycol di-2-ethylbutyrate, 0.16 weight part of dodecylamine were kneaded together and press-molded under the same conditions as in Example 32 to provide a resin film of 0.8 mm in thickness. This resin film was subjected to a moist blushing resistance test as in Example 1. The results are shown in Table 13.

EXAMPLE 57

A resin film was prepared and evaluated as in Example 56 except that 0.17 weight part of di(n-butyl)phosphoric acid and 0.13 weight part of N,N-dimethyloctylamine were used in lieu of 0.16 weight part of di(n-butyl)phosphoric acid and 0.14 weight part of dodecylamine. The results are shown in Table 13.

EXAMPLE 58

A resin film was prepared and evaluated as in Example 56 except that 0.19 weight part of di(n-ethylhexyl)phosphoric acid and 0.11 weight part of dodecylamine were used in lieu of 0.16 weight part of di(n-butyl)phosphoric acid and 0.14 weight part of dodecylamine. The results are shown in Table 13.

EXAMPLE 59

A resin film was prepared and evaluated as in Example 56 except that 0.20 weight part of di(n-ethylhexyl)phosphoric acid and 0.10 weight part of N,N-dimethyloctylamine were used in lieu of 0.16 weight part of di(n-butyl)phosphoric acid and 0.14 weight part of dodecylamine. The results are shown in Table 13.

EXAMPLE 60

A resin film was prepared and evaluated as in Example 56 except that 0.20 weight part of di(n-dodecyl)phosphoric acid and 0.10 weight part of dodecylamine were used in lieu of 0.16 weight part of di(n-butyl)phosphoric acid and 0.14 weight part of dodecylamine. The results are shown in Table 13.

EXAMPLE 61

A resin film was prepared and evaluated as in Example 56 except that 0.21 weight part of di(2-dodecyl)phosphoric acid and 0.09 weight part of N,N-dimethyloctylamine were used in lieu of 0.16 weight part of di(n-butyl)phosphoric acid and 0.14 weight part of dodecylamine. The results are shown in Table 13.

EXAMPLE 62

A resin film was prepared and evaluated as in Example 56 except that 0.17 weight part of diphenylphosphoric acid and 0.13 weight part of dodecylamine were used in lieu of 0.16 weight part of di(n-butyl)phosphoric acid and 0.14 weight part of dodecylamine. The results are shown in Table 13.

COMPARATIVE EXAMPLE 23

A resin film was prepared and evaluated as in Example 56 except that 0.30 weight part of sodium mono(n-dodecyl) phosphate was used in lieu of 0.16 weight part of di(n-butyl) phosphoric acid and 0.14 weight part of dodecylamine. The results are shown in Table 13.

COMPARATIVE EXAMPLE 24

A resin film was prepared and evaluated as in Example 56 except that 0.33 weight part of dodecyltrimethylammonium chloride was used in lieu of 0.16 weight part of di(n-butyl) phosphoric acid and 0.14 weight part of dodecylamine. The results are shown in Table 13.

TABLE 13

|  |  | Phosphoric acid | | | Amine | | | | Haze after 24 |
|---|---|---|---|---|---|---|---|---|---|
|  |  | $R^3$ | $R^4$ | Addition amount | $R^5$ | $R^6$ | $R^7$ | Addition amount | hours of immersion (%) |
| Example | 56 | n-butyl | n-butyl | 0.16 | dodecyl | H | H | 0.14 | 16.5 |
|  | 57 | n-butyl | n-butyl | 0.17 | octyl | methyl | methyl | 0.13 | 17.3 |
|  | 58 | 2-ethylhexyl | 2-ethylhexyl | 0.19 | dodecyl | H | H | 0.11 | 12.6 |
|  | 59 | 2-ethylhexyl | 2-ethylhexyl | 0.20 | octyl | methyl | methyl | 0.10 | 14.6 |
|  | 60 | n-dodecyl | n-dodecyl | 0.20 | dodecyl | H | H | 0.10 | 13.4 |

TABLE 13-continued

|  |  | Phosphoric acid | | | Amine | | | | Haze after 24 |
|---|---|---|---|---|---|---|---|---|---|
|  |  | $R^3$ | $R^4$ | Addition amount | $R^5$ | $R^6$ | $R^7$ | Addition amount | hours of immersion (%) |
|  | 61 | n-dodecyl | n-dodecyl | 0.21 | octyl | methyl | methyl | 0.09 | 15.0 |
|  | 62 | phenyl | phenyl | 0.17 | dodecyl | H | H | 0.13 | 16.7 |
| Compar. | 23 | Sodium (n-dodecyl)phosphoric acid | | | | | | 0.30 | 57.9 |
| Example | 24 | Dodecyltrimethylammonium chloride | | | | | | 0.33 | 54.7 |

EXAMPLE 63

(1) Preparation of a poly(vinyl acetal) resin

In 2890 g of pure water was dissolved 275 g of a poly(vinyl alcohol) having an average polymerization degree of 1700 and a saponification degree of 98.9 mole % under warming. After the temperature of the reaction system was adjusted to 12° C., 201 g of 35 weight % hydrochloric acid catalyst and 148 g of n-butyraldehyde were added and the mixture was incubated at the same temperature to precipitate the reaction product. The reaction system was then maintained at 45° C. for 3 hours to carry the reaction to completion. The reaction mixture was washed with an excess of water to remove the unreacted n-butyraldehyde and the catalyst hydrochloric acid was neutralized with aqueous sodium hydroxide solution. The mixture was further washed with an excess of water for 2 hours and then dried to provide a white powdery poly(vinyl butyral) resin. This poly(vinyl butyral) resin showed an average polymerization degree of 1700, a butyralization degree of 65 mole %, a residual acetyl group content of 1 mole %, a residual vinyl alcohol content of 34 mole %, a neutral salt (NaCl) content of 20 ppm as sodium, and a neutral salt particle diameter of 2 μm.

(2) Production of an interlayer film for laminated glass

To 100 parts of the poly(vinyl butyral) resin obtained as above were added 40 parts of the plasticizer triethylene glycol di-2-ethylbutyrate (3GH), 0.071 part ($2.8 \times 10^{-4}$ mole) of the metal salt of carboxylate (bond strength control agent) magnesium 2-ethylbutanoate (of 6 carbons) and suitable amounts of ultraviolet absorber and antioxidant, followed by thorough mixing. The organic acid content of the 3GH used above was 100 ppm. Then, using a compact extruder (trade name: Laboplastomill, Toyo Precision Machinery) equipped with a T-die, the mixture prepared as above was extruded at an extrusion temperature of 80 to 180° C. and a die exit temperature of 200° C. to provide an interlayer film for laminated glass of about 0.8 mm in thickness.

(3) Production of a laminated glass

After the interlayer film for laminated glass prepared as above was conditioned in a constant-temperature, constant humidity chamber to a water content of 0.4 to 0.5 weight %, it was sandwiched between two float glass sheets (2.4 mm thick) and prebonded by means of a roll. This prebonded assembly was post-bonded in an autoclave at a temperature of 130° C. and a pressure of 13 kg/cm² to provide a laminated glass.

(4) Evaluation

The performance characteristic (Pummel value) of the above laminated glass was evaluated by the method described below. The moisture resistance of the laminate was evaluated by the method described in Example 1. The results are set forth in Table 14.

Evaluation Method (1) Pummel value

The laminated glass left standing at a temperature of −18°±0.6° C. for 16 hours for conditioning is stricken with a hammer having a head weighing 0.45 kg until the diameter of glass fragments produced has reached 6 mm or less. Then, the extent of exposure of the interlayer film after partical exfoliation of the glass was evaluated against the graded limit sample and converted to a Pammel value according to the criteria shown in Table 1. The Pummel value was determined under three conditions, (a) initial, (b) after 1 month at 50° C., and (c) after 2 months at 50° C. The larger the Pammel value is, the higher is the bond strength between sheet and glass. By the same token, the smaller the Pammel value is, the lower is the bond strength between the interlayer film and the glass.

EXAMPLES 64 to 69

Except that the metal salt of carboxylates shown in Table 14 were respectively used as the bond strength control agent, the procedure of Example 63 was otherwise repeated to provide interlayer film for laminated glasses and glass laminates.

COMPARATIVE EXAMPLE 25

Except that 0.04 part ($2.8 \times 10^{-4}$ mole) of magnesium acetate (of 2 carbons) was used in lieu of 0.071 part of magnesium 2-ethylbutanoate as the metal salt of carboxylate in the preparation of an interlayer film for laminated glass, the procedure of Example 63 was otherwise repeated to provide an interlayer film for laminated glass and a laminated glass.

COMPARATIVE EXAMPLE 26

Except that the metal salt of carboxylate shown in Table 14 was incorporated as the bond strength control agent, the procedure of Example 63 was otherwise repeated to provide an interlayer film for laminated glass and a laminated glass.

The performance characteristics of the laminated glasses obtained in Examples 64 to 69 and Comparative Examples 25 and 26 were evaluated as in Example 63. The results are set forth in Table 14.

TABLE 14

| | | Plasticizer | Metal salt of carboxylate (the bond strength control agent) | | Pammer value | | | Haze after 24 hours of immersion (%) |
| --- | --- | --- | --- | --- | --- | --- | --- | --- |
| | | kind (amount) | kind | amount (×10$^{-4}$ mole) | Initial | Passed time A | Passed time B | |
| Example | 63 | 3GH (40) | magnesium 2-ethylbutanoate | 0.071 (2.8) | 5 | 5 | 5 | 41 |
| | 64 | 3GH (40) | magnesium pentanoate | 0.063 (2.8) | 5 | 5 | 5 | 49 |
| | 65 | 3GH (40) | zinc 2-ethylbutanoate | 0.089 (3.0) | 5 | 4 | 4 | 38 |
| | 66 | 3GH (40) | potassium pentanoate | 0.045 (3.2) | 5 | 5 | 5 | 27 |
| | 67 | 3GH (40) | magnesiun 2-ethylpentanoate | 0.079 (2.8) | 5 | 3 | 2 | 38 |
| | 68 | 3GH (40) | magnesiun 2-ethylhexanoate | 0.087 (2.8) | 5 | 3 | 2 | 31 |
| | 69 | 3GH (40) | magnesiun decanoate | 0.103 (2.8) | 5 | 1 | 1 | 28 |
| Compar. Example | 25 | 3GH (40) | magnesium acetate | 0.040 (2.8) | 5 | 5 | 5 | 92 |
| | 26 | 3GH (40) | magnesium butanoate | 0.056 (2.8) | 5 | 5 | 5 | 90 |

EXAMPLE 70

An interlayer film for laminated glass was prepared as in Example 63 except that the following composition was used: 100 parts of the poly(vinyl butyral) resin prepared as in Example 65 (average degree of polymerization: 1650, degree of butyralization: 67 mole %, residual acetyl group content: 1 mole %, residual vinyl alcohol content: 32 mole %, sodium content: 20 ppm, neutral salt particle diameter: 2 μm) as the poly(vinyl acetal) resin, 38 parts of triethylene glycol di-2-ethylhexanoate (3GO) as the plasticizer, 0.071 part (2.8×10$^{-4}$ mole) of magnesium 2-ethylbutanoate (of 6 carbons) as the metal salt of carboxylate, suitable amounts of ultraviolet absorber and antioxidant.

Using the interlayer film for laminated glass obtained as above, a laminated glass was fabricated in the same manner as in Example 63.

EXAMPLES 71 AND 72

Except that the metal salt of carboxylates shown in Table 15 were respectively used as the bond strength control agent, the procedure of Example 70 was otherwise repeated to provide interlayer film for laminated glasses and glass laminates.

EXAMPLE 73

An interlayer film for laminated glass and a laminated glass were prepared as in Example 70 except that a poly (vinyl butyral) resin (average degree of polymerization: 1650, degree of butyralization: 67 mole %, residual acetyl group content: 1 mole %, residual vinyl alcohol content: 32 mole %), the neutral salt (sodium chloride) content of which had been reduced to 10 ppm as sodium by washing with pure water was used as the poly(vinyl acetal) resin.

EXAMPLES 74 TO 78

Except that the metal salt of carboxylates shown in Table 15 were respectively used as the bond strength control agent, the procedure of Example 70 was otherwise repeated to provide interlayer film for laminated glasses and glass laminates.

COMPARATIVE EXAMPLE 27

An interlayer film for laminated glass and a laminated glass were prepared as in Example 70 except that 0.04 part (2.8×10$^{-4}$ mole) of magnesium acetate was added in lieu of 0.071 part of magnesium 2-ethylbutanoate as the metal salt of carboxylate in the preparation of an interlayer film for laminated glass.

The performance characteristics of the glass laminates obtained in Examples 70 to 78 and Comparative Example 27 were evaluated as in Example 63. The results are set forth in Table 15.

TABLE 15

| | | Plasticizer | Metal salt of carboxylate (the bond strength control agent) | | Pammer value | | | Haze after 24 hours of immersion (%) |
| --- | --- | --- | --- | --- | --- | --- | --- | --- |
| | | kind (amount) | kind | amount (×10$^{-4}$ mole) | Initial | Passed time A | Passed time B | |
| Example | 70 | 3G0 (38) | magnesiun 2-ethylbutanoate | 0.071 (2.8) | 5 | 5 | 5 | 42 |
| | 71 | 3G0 (38) | magnesiun octanoate | 0.087 (2.8) | 5 | 5 | 4 | 34 |
| | 72 | 3G0 (38) | magnesiun 2-ethylhexanoate potassium formate | 0.061 (2.0) 0.021 (2.5) | 5 | 4 | 4 | 38 |
| | 73 | 3G0 (38) | magnesiun 2-ethylbutanoate | 0.071 (2.8) | 5 | 5 | 5 | 21 |
| | 74 | 3G0 (38) | magnesiun 2-ethylpentanoate | 0.079 (2.8) | 5 | 3 | 2 | 37 |
| | 75 | 3G0 (38) | magnesiun 2-ethylhexanoate | 0.087 (2.8) | 5 | 3 | 1 | 33 |
| | 76 | 3G0 (38) | magnesiun nonanoate | 0.095 (2.8) | 5 | 2 | 1 | 29 |
| | 77 | 3G0 (38) | magnesiun decanoate | 0.103 (2.8) | 5 | 2 | 1 | 32 |
| | 78 | 3G0 (38) | magnesiun 2-ethylhexanoate potassium formate | 0.061 (2.0) 0.021 (2.5) | 5 | 3 | 2 | 39 |
| Compar. Example | 27 | 3G0 (38) | magnesiun acetate | 0.040 (2.8) | 5 | 5 | 5 | 92 |

EXAMPLE 79

An interlayer film for laminated glass was prepared by the same procedure as in Example 63 except that the following sheet composition was used: 100 parts of a poly(vinyl butyral) resin (average degree of polymerization: 1720, degree of butyralization: 66 mole %, residual acetyl group content: 1 mole %, residual vinyl alcohol content: 33 mole %, sodium content: 20 ppm, neutral salt particle diameter: 2 μm) as the poly(vinyl acetal) resin, 39 parts of tetraethylene glycol di-2-ethylhexanoate (4GO) as the plasticizer, 0.079 part ($2.8 \times 10^{-4}$ mole) of magnesium 2-ethylpentanoate (of 7 carbons) as the metal salt of carboxylate, and suitable amounts of ultraviolet absorber and antioxidant.

Using the interlayer film for laminated glass obtained as above, a laminated glass was fabricated as in Example 63.

EXAMPLES 80 TO 82

Except that the metal salt of carboxylates shown in Table 16 were respectively used as the bond strength control agent, the procedure of Example 79 was otherwise repeated to provide interlayer film for laminated glasses and glass laminates.

COMPARATIVE EXAMPLE 28

An interlayer film for laminated glass and a laminated glass were prepared as in Example 79 except that 0.04 part ($2.8 \times 10^{-4}$ mole) of magnesium acetate (of 2 carbons) was used in lieu of 0.079 part of magnesium 2-ethylpentanoate as the metal salt of carboxylate in the preparation of the interlayer film for laminated glass.

The performance characteristics of the glass laminates obtained in Examples 79 to 82 and Comparative Example 28 were evaluated as in Example 63. The results are set forth in Table 16.

100 parts of a poly(vinyl butyral) resin (average degree of polymerization: degree of 1650, butyralization: 68 mole %, residual acetyl group content: 1 mole %, residual vinyl alcohol content: 31 mole %), the neutral salt (sodium chloride) content of which had been reduced to 20 ppm as sodium by washing with pure water, as the poly(vinyl acetal) resin, 36 parts of dihexyl adipate (DHA) as the plasticizer, 0.071 part ($2.8 \times 10^{-4}$ mole) of magnesium 2-ethylbutanoate (of 6 carbons) as the metal salt of carboxylate, and suitable amounts of ultraviolet absorber and antioxidant.

Using the laminate glass interlayer film obtained as above, a laminated glass was fabricated as in Example 63.

EXAMPLES 84 AND 85

Except that the metal salt of carboxylates shown in Table 17 were respectively used as the bond strength control agent, interlayer film for laminated glasses and glass laminates were prepared as in Example 83.

COMPARATIVE EXAMPLE 29

An interlayer film for laminated glass and a laminated-glass were prepared as in Example 83 except that 0.04 part ($2.8 \times 10^{-4}$ mole) of magnesium acetate (of 2 carbons) was added in lieu of 0.071 part of magnesium 2-ethylbutanoate as the metal salt of carboxylate in the preparation of the interlayer film.

COMPARATIVE EXAMPLE 30

Except that the metal salt of carboxylate shown in Table 17 was used as the bond strength control agent, the procedure of Example 83 was otherwise repeated to provide an interlayer film for laminated glass and a laminated glass.

TABLE 16

|  |  | Prasticizer | Metal salt of carboxylate (the bond strength control agent) |  | | Pammer value | | Haze after 24 hours of |
|---|---|---|---|---|---|---|---|---|
|  |  | kind (amount) | kind | amount ($\times 10^{-4}$ mole) | Initial | Passed time A | Passed time B | immersion (%) |
| Example | 79 | 4G0 (39) | magnesium 2-ethylpentanoate | 0.079 (2.8) | 5 | 5 | 5 | 32 |
|  | 80 | 4G0 (39) | magnesium 2-ethylbutanoate | 0.071 (2.8) | 5 | 3 | 2 | 40 |
|  | 81 | 4G0 (39) | magnesium 2-ethylhexanoate | 0.087 (2.8) | 5 | 3 | 1 | 28 |
|  | 82 | 4G0 (39) | magnesium nonanoate | 0.095 (2.8) | 5 | 3 | 2 | 25 |
| Compar. Example | 28 | 4G0 (39) | magnesium acetate | 0.040 (2.8) | 5 | 5 | 5 | 92 |

EXAMPLE 83

An interlayer film for laminated glass was prepared as in Example 63 except that the following composition was used:

The performance characteristics of the glass laminates obtained in Examples 83 to 85 and Comparative Examples 29 and 30 were evaluated as in Example 63. The results are set forth in Table 17.

TABLE 17

|  |  | Prasticizer | Metal salt of carboxylate (the bond strength control agent) |  | | Pammer value | | Haze after 24 hours of |
|---|---|---|---|---|---|---|---|---|
|  |  | kind (amount) | kind | amount ($\times 10^{-4}$ mole) | Initial | Passed time A | Passed time B | immersion (%) |
| Example | 79 | 4G0 (39) | magnesiun 2-ethylpentanoate | 0.079 (2.8) | 5 | 5 | 5 | 32 |
|  | 80 | 4G0 (39) | magnesiun 2-ethylbutanoate | 0.071 (2.8) | 5 | 3 | 2 | 40 |
|  | 81 | 4G0 (39) | magnesiun 2-ethylhexanoate | 0.087 (2.8) | 5 | 3 | 1 | 28 |

TABLE 17-continued

| | | Prasticizer kind (amount) | Metal salt of carboxylate (the bond strength control agent) kind | amount (×10⁻⁴ mole) | Pammer value Initial | Passed time A | Passed time B | Haze after 24 hours of immersion (%) |
|---|---|---|---|---|---|---|---|---|
| | 82 | 4G0 (39) | magnesiun nonanoate | 0.095 (2.8) | 5 | 3 | 2 | 25 |
| Compar. Example | 28 | 4G0 (39) | magnesium acetate | 0.040 (2.8) | 5 | 5 | 5 | 92 |

EXAMPLE 86

One-hundred (100) weight parts of the poly(vinyl butyral) resin obtained in Example 42, 40 weight parts of triethylene glycol di-2-ethylbutyrate, 0.056 weight part of camphorsulfonic acid and 0.044 weight part of N,N-dimethyloctylamine were kneaded together and press-molded under the same conditions as in Example 42 to provide a resin film of 0.8 mm in thickness. This resin film was subjected to a moist blushing test as in Example 1. The results are shown in Table 18.

EXAMPLE 87

A resin film was prepared and evaluated in the same manner as in Example 86 except that 0.043 weight part of hydroxypropanesulfonic acid and 0.057 weight part of N,N-dimethyloctylamine were used in lieu of 0.056 weight part of comphorsulfonic acid and 0.044 weight part of N,N-dimethyloctylamine. The results are shown in Table 18.

EXAMPLE 88

Except that 0.056 weight part of mesitylenesulfonic acid was used in lieu of 0.056 weight part of camphorsulfonic acid, a resin film was prepared and evaluated as in Example 86. The results are shown in Table 18.

EXAMPLE 89

A resin film was prepared and evaluated as in Example 86 except that 0.08 weight part of dodecylbenzenesulfonic acid and 0.02 weight part of pyridine were used in lieu of 0.056 weight part of comphorsulfonic acid and 0.044 weight part of N,N-dimethyloctylamine. The results are shown in Table 18.

EXAMPLE 90

A resin film was prepared and evaluated as in Example 86 except that 0.061 weight part of dodecylbenzenesulfonic acid and 0.039 weight part of p-toluidine were used in lieu of 0.056 weight part of camphorsulfonic acid and 0.044 weight part of N,N-dimethyloctylamine. The results are shown in Table 18.

EXAMPLE 91

A resin film was prepared and evaluated as in Example 86 except that 0.048 weight part of 1,1-cyclohexanediacetic acid and 0.104 weight part of dodecylamine were used in lieu of 0.056 weight part of comphorsulfonic acid and 0.044 weight part of N,N-dimethyloctylamine. The results are shown in Table 18.

EXAMPLE 92

A resin film was prepared and evaluated as in Example 86 except that 0.042 weight part of salicylic acid and 0.06 weight part of dodecylamine were used in lieu of 0.056 weight part of camphorsulfonic acid and 0.044 weight part of N,N-dimethyloctylamine. The results are shown in Table 18.

COMPARATIVE EXAMPLE 31

A resin film was prepared and evaluated as in Example 86 except that 0.1 weight part of pyridine was used in lieu of 0.056 weight part of camphorsulfonic acid and 0.044 weight part of N,N-dimethyloctylamine. The results are shown in Table 18.

COMPARATIVE EXAMPLE 32

A resin film was prepared and evaluated as in Example 86 except that 0.1 weight part of salicylic acid was used in lieu of 0.056 weight part of camphorsulfonic acid and 0.044 weight part of N,N-dimethyloctylamine. The results are shown in Table 18.

COMPARATIVE EXAMPLE 33

A resin film was prepared and evaluated as in Example 86 except that 0.1 weight part of sodium camphorsulfonate was used in lieu of 0.056 weight part of camphorsulfonic acid and 0.044 weight part of N,N-dimethyloctylamine. The results are shown in Table 18.

COMPARATIVE EXAMPLE 34

A resin film was prepared and evaluated as in Example 86 except that 0.1 weight part of pyridinium chloride was used in lieu of 0.056 weight part of camphorsulfonic acid and 0.044 weight part of N,N-dimethyloctylamine. The results are shown in Table 18.

TABLE 18

| | | Organic acid | | Amine | | Haze after 24 hours of immersion (%) |
|---|---|---|---|---|---|---|
| | | kind | addition amount | kind | addition amount | |
| Example | 86 | camphorsulfonic acid | 0.056 | N,N-dimethyloctyl amine | 0.044 | 25.7 |
| | 87 | hydroxypropanesulfonic acid | 0.043 | N,N-dimethyloctyl amine | 0.057 | 29.0 |
| | 88 | mesytylenesulfonic acid | 0.056 | N,N-dimethyloctyl amine | 0.044 | 20.4 |
| | 89 | dodecylbenzenesulfonic acid | 0.08 | pyridine | 0.02 | 21.4 |
| | 90 | dodecylbenzenesulfonic acid | 0.061 | p-toluidine | 0.039 | 19.8 |
| | 91 | 1,1-cyclohexane diacetate | 0.048 | dodecylamine | 0.104 | 26.9 |
| | 92 | salicylic acid | 0.042 | dodecylamine | 0.06 | 26.1 |
| Compar. Example | 31 | — | — | pyridine | 0.1 | 46.2 |
| | 32 | salicylic acid | 0.1 | — | — | 35.1 |
| | 33 | Sodiun camphorsulfonate | | | 0.1 | 66.2 |
| | 34 | pyridinium chloride | | | 0.1 | 54.7 |

EXAMPLE 93

One-hundred (100) weight parts of the poly(vinyl butyral) resin prepared in Example 42, 40 weight parts of triethylene glycol di-2-ethylbutyrate, 0.4 weight part of octanoic acid, 0.11 weight part of N,N-dimethyloctylamine and 0.037 weight part of magnesium 2-ethylbutyrate were kneaded together and press-molded as in Example 42 to provide a resin film of 0.8 mm in thickness. This resin film was subjected to a moist blushing test as in Example 1.

In addition, the above resin film was sandwiched between two glass sheets (4×4 cm) to fabricate a laminated glass. Using this laminated glass, a peeling test was performed by the following method. The results are shown in Table 19.

Peeling Test

The laminated glass was immersed in water at 60° C. for 1 week and dried in an oven at 80° C. for 4 hours. This immersion and drying cycle was repeated for a total of 3 times and the degree of exfoliation of the interlayer film adjoining to the laminated glass was visually examined.

EXAMPLE 94

A resin film and a laminated glass were prepared and evaluated as in Example 93 except that the amount of N,N-dimethyloctylamine was altered to 0.28 weight part. The results are shown in Table 19.

EXAMPLE 95

A resin film and a laminated glass were prepared and evaluated as in Example 93 except that the amount of octanoic acid was altered to 0.1 weight part and that of N,N-dimethyloctylamine was altered to 0.06 weight part. The results are shown in Table 19.

EXAMPLE 96

A resin film and a laminated glass were prepared and evaluated as in Example 93 except that the amount of octanoic acid and N,N-dimethyloctylamine were altered to 0.2 weight part and 0.09 weight part, respectively, and, in addition, 0.045 weight part of magnesium 2-ethylhexanoate was used in lieu of 0.037 weight part of magnesium 2-ethylbutyrate. The results are shown in Table 19.

EXAMPLE 97

A resin film and a laminated glass were prepared and evaluated as in Example 93 except that the amount of octanoic acid and N,N-dimethyloctylamine were altered to 0.1 weight part and 0.06 weight part, respectively, and that 0.045 weight part of magnesium 2-ethylhexanoate was used in lieu of 0.037 weight part of magnesium 2-ethylbutyrate. The results are shown in Table 19.

EXAMPLE 98

A resin film and a laminated glass were prepared and evaluated as in Example 93 except that the amount of octanoic acid was altered to 0.1 weight part and that 0.06 weight part of decylamine and 0.045 weight part of magnesium 2-ethylhexanoate were used in lieu of 0.11 weight part of N,N-dimethyloctylamine and 0.037 weight part of magnesium 2-ethylbutyrate. The results are shown in Table 19.

EXAMPLE 99

A resin film and a laminated glass were prepared and evaluated as in Example 93 except that 0.03 weight part of di(2-ethylhexyl)phosphoric acid was used in lieu of 0.4 weight part of octanoic acid and that the amount of N,N-dimethyloctylamine was altered to 0.02 weight part. The results are shown in Table 19.

COMPARATIVE EXAMPLE 35

The laminated glass obtained in Comparative Example 12 was subjected to a peeling test as in Example 93. The results are shown in Table 19.

COMPARATIVE EXAMPLE 36

A resin film and a laminated glass were prepared and evaluated as in Example 93 except that the addition of octanoic acid and N,N-dimethyloctylamine was omitted. The results are shown in Table 19.

COMPARATIVE EXAMPLE 37

A resin film and a laminated glass were prepared and evaluated as in Example 93 except that the addition of N,N-dimethyloctylamine was omitted. The results are shown in Table 19.

COMPARATIVE EXAMPLE 38

A resin film and a laminated glass were prepared and evaluated as in Example 93 except that the addition of octanoic acid was omitted. The results are shown in Table 19.

COMPARATIVE EXAMPLE 39

A resin film and a laminated glass were prepared and evaluated as in Example 93 except that the addition of octanoic acid and N,N-dimethyloctylamine was omitted and that 0.045 weight part of magnesium 2-ethylhexanoate was used in lieu of 0.037 weight part of magnesium 2-ethylbutyrate. The results are shown in Table 19.

COMPARATIVE EXAMPLE 40

A resin film and a laminated glass were prepared and evaluated as in Example 93 except that 0.2 weight part of octanoic acid and 0.045 weight part of magnesium 2-ethylhexanoate were used in lieu of 0.4 weight part of octanoic acid, 0.11 weight part of N,N-dimethyloctylamine and 0.037 weight part of magnesium 2-ethylbutyrate. The results are shown in Table 19.

COMPARATIVE EXAMPLE 41

A resin film and a laminated glass were prepared and evaluated as in Example 93 except that 0.1 weight part of octanoic acid and 0.045 weight part of magnesium 2-ethylhexanoate were used in lieu of 0.4 weight part of octanoic acid, 0.11 weight part of N,N-dimethyloctylamine and 0.037 weight part of magnesium 2-ethylbutyrate. The results are shown in Table 19.

having the haze after 24 hours of immersion of not more than 50% when said interlayer film with a thickness of 0.3 to 0.8 mm is immersed in water at 23° C.

4. The interlayer film for laminated glass according to claim 3 wherein the concentration of potassium in the interlayer film is not greater than 100 ppm.

5. The interlayer film for laminated glass according to claim 3 which comprises a compound capable of forming a complex with sodium and potassium salts.

6. The interlayer film for laminated glass according to claim 3 which further comprises an organic acid compatible with the resin and plasticizer and an amine compatible with the resin and plasticizer.

7. A laminated glass comprising at least one pair of glass sheets and, as interposed, therebetween, the interlayer film according to claim 3.

8. An interlayer film for laminated glass comprising a plasticized poly (vinyl acetal) resin and at least one member selected from the group consisiting of alkali metal salts and alkaline earth metal salts wherein the alkali metal salt has a particle diameter of not greater than 3 m and the alkaline earth metal salt has a particle diameter of not greater than 3 m.

TABLE 19

| | | Organic acid | | Amine | | Organic acid magnesium | | Haze after 24 hours of immersion (%) | Presence or absence of peeling |
|---|---|---|---|---|---|---|---|---|---|
| | | kind | addition amount | kind | addition amount | kind | addition amount | | |
| Ex. | 93 | octanoic acid | 0.4 | N,N-dimethyloctylamine | 0.11 | magnesium 2-ethylbutyrate | 0.037 | 24.3 | none |
| | 94 | octanoic acid | 0.4 | N,N-dimethyloctylamine | 0.28 | magnesium 2-ethylbutyrate | 0.037 | 22.5 | none |
| | 95 | octanoic acid | 0.1 | N,N-dimethyloctylamine | 0.06 | magnesium 2-ethylbutyrate | 0.037 | 25.3 | none |
| | 96 | octanoic acid | 0.2 | N,N-dimethyloctylamine | 0.09 | magnesium 2-ethylhexanoate | 0.045 | 19.0 | none |
| | 97 | octanoic acid | 0.1 | N,N-dimethyloctylamine | 0.06 | magnesium 2-ethylhexanoate | 0.045 | 20.6 | none |
| | 98 | octanoic acid | 0.1 | decylamine | 0.06 | magnesium 2-ethylhexanoate | 0.045 | 19.4 | none |
| | 99 | di(2-ethylhexyl) phosphoric acid | 0.03 | N,N-dimethyloctylamine | 0.02 | magnesium 2-ethylbutyrate | 0.037 | 25.6 | none |
| Comp. Ex. | 35 | — | — | — | — | — | — | 33.4 | presence |
| | 36 | — | — | — | — | magnesium 2-ethylbutyrate | 0.037 | 68.9 | none |
| | 37 | octanoic acid | 0.4 | — | — | magnesium 2-ethylbutyrate | 0.037 | 36.6 | none |
| | 38 | — | — | N,N-dimethyloctylamine | 0.11 | magnesium 2-ethylbutyrate | 0.037 | 71.2 | none |
| | 39 | — | — | — | — | magnesium 2-ethylhexanoate | 0.045 | 45.2 | none |
| | 40 | octanoic acid | 0.2 | — | — | magnesium 2-ethylhexanoate | 0.045 | 36.7 | none |
| | 41 | octanaic acid | 0.1 | — | — | magnesium 2-ethylhexanoate | 0.045 | 38.9 | none |

INDUSTRIAL APPLICABILITY

Having the constitution described above, the present invention provides an interlayer film for laminated glass and a laminated glass, which are substantially free from blushing along the peripheral edge of the glass even in a highly humid environment and not compromised in transparency, weather resistance, bond strength and penetration resistance.

What is claimed is:

1. An interlayer film for laminated glass comprising a plasticized poly(vinyl acetal) resin and a sodium salt wherein the sodium salt in said interlayer film has a particle diameter of not greater than 5 µm and said interlayer having the haze after 24 hours of immersion of not more than 50% when said interlayer film with a thickness of 0.3 to 0.8 mm is immersed in water at 23° C.

2. The interlayer film for laminated glass according to claim 1 wherein the concentration of sodium in the interlayer film is not greater than 50 ppm.

3. An interlayer film for laminated glass comprising a plasticized poly(vinyl acetal) resin and a potassium salt wherein the particle diameter of the potassium salt in the interlayer film is not greater than 5 µm and said interlayer 9. The interlayer film for laminated glass according to claim 8 wherein the alkali metal salt is an alkali metal salt of an organic acid containing 5 to 16 carbon atoms and the alkaline earth metal salt is an alkaline earth metal of an organic acid containing 5 to 16 carbon atoms.

10. The interlayer film for laminated glass comprising plasticized poly(vinyl acetal) and a sodium salt wherein the sodium salt in said interlayer film has a particle diameter of not greater than 5 µm.

11. The interlayer film for laminated glass according to claim 10 wherein the concentration of sodium in the interlayer film is not greater than 50 ppm.

12. An interlayer film for laminated glass according to claim 10 wherein the concentration of potassium in the interlayer film is not greater than 100 ppm.

13. The interlayer film for laminated glass according to claim 10 which comprises a compound capable of forming a complex with sodium and potassium salts.

14. The interlayer film for laminated glass according to claim 10 which further comprises an organic acid compatible with the resin and plasticizer and an amine compatible with the resin and plasticizer.

15. The interlayer film for laminated glass according to claim 10 further comprises at least one alkaline earth metal salt.

16. An interlayer film for laminated glass according to claim 15 wheein the alkaline earth metal salt has a particle diameter of not greater than 3 µm.

17. An interlayer film for laminated glass according to claim 15 wherein the alkaline earth metal salt is an alkaline earth metal salt of an organic acid containing 5 to 16 carbon atoms.

18. A laminated glass comprising at least one pair of glass sheets and, as interposed therebetween, the interlayer film according to claim 10.

19. An interlayer film for laminated glass comprising a plasticized poly(vinyl acetal) and a potassium salt wherein the particles diameter of the potassium salt in the interlayer film is not greater than 5 µm.

20. The interlayer film for laminated glass according to claim 19, wherein said poly (vinyl acetal) resin is produced by the process which comprises washing the synthesized poly (vinyl acetal) resin with water until a pH of 5 or above is attained, and drying it at a temperature of not higher than 60° C., without resort to neutralization procedure.

21. The interlayer film for laminated glass according to claim 20, wherein said washing is carried out with water at a temperature of not lower than 40° C.

22. The interlayer film for laminated glass according to claim 19, wherein said poly (vinyl acetal resin is produced by the process which comprises using, in synthesizing a poly (vinyl acetal) resin by reacting poly (vinyl alcohol) with an aldehyde in the presence of hydrochloric acid catalyst, and epoxide as both a reaction terminator and a hydrochloric acid eliminator.

23. The interlayer film for laminated glass according to claim 22, wherein said epoxide has the following general formula (I).

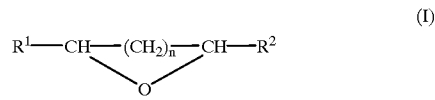

wherein $R^1$ and $R^2$ each represent a hydrogen atom or an alkyl group and n represents an interger of 0 to 3.

24. An interlayer film for laminated glass comprising a plasticized poly(vinyl acetal) and a potassium salt wherein the particle diameter of the potassium salt in the interlayer film is not greater than 5 µm and the concentration of potassium in the interlayer film is not greater than 100 ppm.

* * * * *

UNITED STATES PATENT AND TRADEMARK OFFICE
CERTIFICATE OF CORRECTION

PATENT NO.   : 6,387,516 B2
DATED        : May 14, 2002
INVENTOR(S)  : Tokushige Shichiri et al.

It is certified that error appears in the above-identified patent and that said Letters Patent is hereby corrected as shown below:

<u>Column 54,</u>
Lines 21-23, change "particle diameter of not greater than 3 m and the alkaline earth metal salt has a particle diameter of not greater than 3 m." to -- particle diameter of not greater than 3μm and the alkaline earth metal salt has a particle diameter of not greater than 3μm. --

Signed and Sealed this

Twenty-ninth Day of July, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,387,516 B2
DATED : May 14, 2002
INVENTOR(S) : Shichiri et al.

It is certified that error appears in the above-identified patent and that said Letters Patent is hereby corrected as shown below:

Column 54,
Line 51, "The" should read -- An --.
Line 58, "An" should read -- The --.

Column 55,
Lines 4 and 7, "An" should read -- The --.

Column 56,
Line 2, "said poly (vinyl acetal resin" should read -- said poly (vinyl acetal) resin --.
Lines 5-6, "and epoxide" should read -- an epoxide --.

Signed and Sealed this

Ninth Day of September, 2003

JAMES E. ROGAN
*Director of the United States Patent and Trademark Office*